US012646723B2

(12) United States Patent
Manthiram et al.

(10) Patent No.: US 12,646,723 B2
(45) Date of Patent: Jun. 2, 2026

(54) MULTILAYERED ANODE AND ASSOCIATED METHODS AND SYSTEMS

(71) Applicant: Board of Regents, The University of Texas System, Austin, TX (US)

(72) Inventors: Arumugam Manthiram, Austin, TX (US); Brian Theodore Heligman, Austin, TX (US); Karl Joseph Kreder, III, Austin, TX (US); Kevin Scanlan, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 584 days.

(21) Appl. No.: 17/629,726

(22) PCT Filed: Jul. 24, 2020

(86) PCT No.: PCT/US2020/043468
§ 371 (c)(1),
(2) Date: Jan. 24, 2022

(87) PCT Pub. No.: WO2021/016549
PCT Pub. Date: Jan. 28, 2021

(65) Prior Publication Data
US 2022/0285692 A1 Sep. 8, 2022

Related U.S. Application Data

(60) Provisional application No. 62/878,327, filed on Jul. 24, 2019.

(51) Int. Cl.
*H01M 4/66* (2006.01)
*H01M 4/24* (2006.01)
(Continued)

(52) U.S. Cl.
CPC ........... *H01M 4/667* (2013.01); *H01M 4/244* (2013.01); *H01M 4/366* (2013.01); *H01M 4/382* (2013.01);
(Continued)

(58) Field of Classification Search
None
See application file for complete search history.

(56) References Cited

U.S. PATENT DOCUMENTS 3,982,960 A 9/1976 Hoekje et al.
6,432,586 B1 8/2002 Zhang
(Continued)

FOREIGN PATENT DOCUMENTS

WO 2013-052456 A1 4/2013
WO 2018-090097 A1 5/2018
WO 2018-201125 A1 11/2018

OTHER PUBLICATIONS

He et al, Recent advances in understanding dendrite growth on alkali metal anodes, Apr. 18, 2019, EnergyChem, 1-22 (Year: 2019).*
(Continued)

*Primary Examiner* — Mary Grace Byram
(74) *Attorney, Agent, or Firm* — Kilpatrick Townsend & Stockton LLP

(57) ABSTRACT

Described herein are multilayer composite foil materials, as well as methods of making and using multilayer composite foil materials. The composite foil materials can comprise different layers of different metals which may have differing activity toward an active metal, such as lithium. The different layers may allow the composite foil material to include layers that are more active towards the active metal, providing for electrochemical activity, and other layers that are less active towards the active metal, and serving as structural
(Continued)

layers. The multilayer composite foils are useful as anodes of electrochemical cells, such as lithium ion cells.

23 Claims, 18 Drawing Sheets

(51) Int. Cl.

| | |
|---|---|
| *H01M 4/36* | (2006.01) |
| *H01M 4/38* | (2006.01) |
| *H01M 4/46* | (2006.01) |
| *H01M 4/56* | (2006.01) |
| *H01M 10/052* | (2010.01) |
| *H01M 10/0525* | (2010.01) |
| *H01M 4/02* | (2006.01) |

(52) U.S. Cl.
CPC ........... *H01M 4/387* (2013.01); *H01M 4/463* (2013.01); *H01M 4/56* (2013.01); *H01M 4/661* (2013.01); *H01M 4/662* (2013.01); *H01M 10/052* (2013.01); *H01M 10/0525* (2013.01); *H01M 2004/027* (2013.01)

(56) References Cited

U.S. PATENT DOCUMENTS

| | | | |
|---|---|---|---|
| 2004/0053123 A1 | 3/2004 | Chang et al. | |
| 2004/0175621 A1* | 9/2004 | Iriyama ................... | H01M 4/36 |
| | | | 204/192.15 |
| 2004/0219428 A1 | 11/2004 | Nagayama | |
| 2005/0175900 A1* | 8/2005 | Yasuda ............... | H01M 4/0452 |
| | | | 429/231.95 |
| 2006/0093921 A1 | 5/2006 | Scott et al. | |
| 2006/0139850 A1 | 6/2006 | Rorvick et al. | |
| 2006/0292444 A1 | 12/2006 | Chiang et al. | |
| 2008/0241687 A1 | 10/2008 | Ishii et al. | |
| 2009/0233180 A1* | 9/2009 | Ihara ..................... | H01M 4/366 |
| | | | 429/336 |
| 2009/0246626 A1 | 10/2009 | Tasaki et al. | |
| 2011/0070478 A1 | 3/2011 | Meschter | |
| 2011/0111304 A1* | 5/2011 | Cui ......................... | H01M 4/70 |
| | | | 429/231.95 |
| 2011/0192622 A1* | 8/2011 | Kurasawa ............. | H01M 4/366 |
| | | | 173/217 |
| 2011/0274964 A1 | 11/2011 | Tuffile | |

| | | | |
|---|---|---|---|
| 2012/0135142 A1 | 5/2012 | Yang et al. | |
| 2012/0171574 A1 | 7/2012 | Zhamu et al. | |
| 2013/0108922 A1 | 5/2013 | Shinozaki et al. | |
| 2014/0162085 A1 | 6/2014 | Seki et al. | |
| 2014/0255793 A1 | 9/2014 | Zhang et al. | |
| 2014/0335401 A1* | 11/2014 | Wohrle ............... | H01M 50/129 |
| | | | 29/623.2 |
| 2015/0214549 A1* | 7/2015 | Suto ..................... | H01M 10/054 |
| | | | 429/200 |
| 2015/0318544 A1 | 11/2015 | Yu et al. | |
| 2015/0349346 A1 | 12/2015 | Yushin et al. | |
| 2016/0049655 A1 | 2/2016 | Fasching et al. | |
| 2016/0072132 A1 | 3/2016 | Liao et al. | |
| 2019/0173090 A1* | 6/2019 | Liang ..................... | H01M 4/75 |

OTHER PUBLICATIONS

Heligman et al., 2019, "Zn—Sn Interdigitated Eutectic Alloy Anodes with High Volumetric Capacity for Lithium-Ion Batteries," Joule, 3, 1-13, DOI: 10.1016/j.joule.2019.01.005.

Kreder et al., 2017, "Interdigitated Eutectic Alloy Foil Anodes for Rechargeable Batteries," ACS Energy Lett., 2, 2422-2423, DOI: 10.1021/acsenergylett.7b00844.

Obrovac et al., 2014, Alloy Negative Electrodes for Li-Ion Batteries, Chem. Rev., 114, 11444-11502, DOI: 10.1021/cr500207g.

Tsuji et al. 2003, ARB (Accumulative Roll-Bonding) and other new techniques to produce bulk ultrafine grained materials, Advanced Engineering Materials, 5(5), 338-344, DOI: 10.1002/adem.200310077.

Obrovac et al., 2007, Alloy Design for Lithium-Ion Battery Anodes, J. Electrochem. Soc., 154(9), A849, DOI: 10.1149/1.2752985.

Ji et al., 2016, A Novel and Generalized Lithium-Ion-Battery Configuration utilizing Al Foil as Both Anode and Current Collector for Enhanced Energy Density, Adv. Mater., 29(7), 1604219, DOI: 10.1002/adma.201604219.

International Search Report and Written Opinion mailed Oct. 19, 2020 in International Patent Application No. PCT/US2020/043468, 19 pages.

International Preliminary Report on Patentability mailed on Feb. 3, 2022 in International Patent Application No. PCT/US2020/043468, 17 pages.

International Search Report and Written Opinion mailed Sep. 18, 2018 in International Patent Application No. PCT/US2018/030121, 10 pages.

Wilson, Lithium Insertion in Carbonaceous Materials Containing Silicon, Mar. 1997; p. 26 para 2, p. 8 para 6.

* cited by examiner

100

200

MULTILAYERED ANODE AND ASSOCIATED METHODS AND SYSTEMS

CROSS REFERENCE TO RELATED APPLICATIONS

This application is a U.S. National Stage of PCT International Application No. PCT/US2020/043468, filed on Jul. 24, 2020, which claims the benefit of and priority to U.S. Provisional Application No. 62/878,327, filed on Jul. 24, 2019, which are hereby incorporated by reference in their entirety.

STATEMENT REGARDING FEDERALLY SPONSORED RESEARCH OR DEVELOPMENT

This invention was made with government support under Grant No. DE-SC0005397 awarded by the Department of Energy. The government has certain rights in the invention.

FIELD

This application relates generally to nanocomposite metal foils, as well as anodes for electrochemical cells comprising these foils.

BACKGROUND

Anodes for lithium batteries generally come in two forms: metallic lithium and carbon (graphite) anodes. In metallic lithium anodes, lithium ions are released from the metallic lithium anode during discharging. In a graphite anode, graphite serves as a host for lithium ions, where lithium ions are released during discharge and taken up during charging. For achieving higher energy storage capacities, anodes more like metallic lithium are useful, but due to safety concerns, metallic lithium anodes are generally not used in rechargeable batteries.

SUMMARY

Disclosed herein are composite foil materials, which can have nanoscale or sub-micron structures. For example, the disclosed composite foil materials can comprise sub-micron sized layers of different metals that can overcome cycling stresses, ensuring structural integrity upon cycling. As a consequence, the composite foil materials can be used to form anodes for use in electrochemical cells (e.g., batteries).

The disclosed composite foil materials can comprise, for example, a multilayer structure including a plurality of layers of a first type and a plurality of layers of a second type. In examples, the layers of the first type (first layers) may comprise a first metal and the layers of the second type (second layers) may comprise a second metal. The two metals may be different and may exhibit different activity toward another metal, such as an active metal. Each of the layers of the plurality of layers may have thicknesses independent of other layers. Example layer thickness of individual layers may be from 0.05 μm to 5 μm. Example total thickness of the composite metal foil may be from 10 μm to 200 μm. In some cases, total thickness be thinner than 10 μm or, optionally, thicker than 200 μm. In some cases, different layers may have the same or different thicknesses, but with an average layer thickness of from 0.05 μm to 5 μm. In some examples, the plurality of layers may comprise 2 to 2000 first layers and/or 2 to 2000 second layers. In some cases, 8 to 64 layers may be used. Coatings may be optionally applied over any one or more first layers and/or one or more second layers. The first layers may optionally occupy a majority of the total volume of the composite metal foil, such as at least 50% or up to 90% of the total volume of the composite foil material. For example, the second layers may comprise from 15% to 25% (e.g., 20%) of the total volume of the composite foil material.

As used herein, an active metal may include a metallic element that participates in electrochemical reactions in a battery or electrochemical cell. In some examples, active metals may be a Group I metal or a Group II metal. Specific example active metals include, but are not limited to, lithium or sodium. Various other metals may have a different activity, reactivity, or affinity towards an active metal. In some cases, activity may be potential dependent and/or dependent on the identity of the active metal. For example, the relative activities of different metals towards lithium may be different from the relative activities of different metals towards sodium. In one example, an activity of various metals toward an active metal (e.g., lithium) may be as follows (in order of decreasing activity): antimony>tin>bismuth>indium>lead>silicon>aluminum>zinc>cadmium>magnesiu manganese, zirconium.

The structure of the composite foils described herein including different layers of different metals (e.g., first layers comprising first metal and second layers comprising second metal, as described above) having different activity towards an active metal may advantageously lend the composite foil to use as an electrode active material in an electrochemical cell, such as an anode. The first layers may serve as sites for preferentially taking up and/or releasing cations of the active metal as compared to the second layers, which can serve, at least in part, as conductive structural components. In one example, the first metal can exhibit uptake of cations of the active metal during electrochemical reactions at a first potential relative to an electrode of the active metal in metallic form, while the second metal may not exhibit uptake of cations of the active metal in electrochemical reactions at that first potential, or may exhibit uptake of the cations at a significantly slower rate than the first metal. For example, when the active metal is lithium, the first metal may exhibit uptake of lithium cations in electrochemical reactions at a potential of from 0 V to 1.5 V relative to Li/Li$^+$. Similarly, the second metal may exhibit no uptake or slower uptake of lithium cations in electrochemical reactions at the potential of from 0 V to 1.5 V relative to Li/Li$^+$.

The two types of layers in the composite foils, referred to herein as first layers and second layers, may have different compositions. In some cases, the first layers may comprise an alloy of a first metal (i.e., a first metal alloy). In some cases, the second layers may comprise an alloy of a second metal (i.e., a second metal alloy). Various different metals may be used for the first layers, such as, but not limited to, tin or a tin alloy, aluminum or an aluminum alloy, indium or an indium alloy, zinc or a zinc alloy, lead or a lead alloy. In some cases, the first metal may be alloyed or doped by another metal having a greater activity than the first metal. An example dopant may be antimony. Example tin alloys may comprise tin and one or more of aluminum, antimony, bismuth, cadmium, copper, zinc, silver, indium, or nickel. Example aluminum alloys may comprise aluminum and one or more of manganese, magnesium, silicon, copper, scandium, tin, zinc, or lithium. Example zinc alloys may comprise zinc and aluminum. Example lead alloys may comprise lead and one or more of antimony, copper, cadmium, or tin. Various different metals or alloys may be used for the second layers, such as, but not limited to, copper, zinc, magnesium, iron, nickel, aluminum, zirconium, hafnium, niobium, molybdenum, or any combination or alloys of these. The first layers and/or the second may optionally include one or more solutes, intermetallic particles, nonmetallic particles, ceramic particles, or the like. In some cases, the first metal of the first layers and/or the second metal of the second layers may be doped with, contain, and/or alloyed with the active metal, such as in an amount of up to 25 wt. %. In some cases, first layers or second layers may be free or substantially free of dislocations or treated to reduce or remove dislocations. In some cases, first layers or second layers may be subjected to work hardening to increase a strength or decrease a malleability of the layers. In some cases, one or more first layers and/or one or more second layers may be porous or non-porous. In some examples, one or more first layers and/or one or more second layers may have a porosity of up to 50%.

The structure of the composite foils disclosed herein may include an alternating layer configuration, such as where a plurality of the first layers alternate with a plurality of second layers. In some cases, two first layers may be adjacent to one another or two second layers may be adjacent to one another. In some cases, a first layer may be continuous between two second layers. Optionally, a first layer may be discontinuous between two second layers, meaning there may be regions between two second layers where there is a first layer present and other regions between the two second layers where the first layer is not present. In some cases, a second layer may be continuous between two first layers. Optionally, a second layer may be discontinuous between two first layers, meaning there may be regions between two first layers where there is a second layer present and other regions between the two first layers where the second layer is not present.

In some cases, additional layers may be present in the composite foils, such as layers that may serve as conductive layers or current collectors and/or layers that prevent first layers from contacting second layers and/or layers that prevent formation of intermetallic particles. In some cases, an additional layer may be referred to herein as an interlayer. Useful interlayers may comprise different metals than the first metal, the second metal, or the active metal. Useful interlayers may comprise an alloy of the active metal. Useful interlayers may be positioned between different first layers, between different second layers, between first layers and second layers, between different regions containing multiple first layers and multiple second layers, or the like.

The disclosed composite foil materials may have a hierarchical structure. In some cases, the hierarchical structure may result from the process by which the composite foil is made, as discussed below. In some examples, the hierarchical structure may comprise different regions of layers having different layer thicknesses, different numbers of layers, different total thickness, or the like. For example, a hierarchical structure may comprise a first region of alternating first and second layers of an average thickness, a second region of alternating first and second layers of a larger average thickness. However, in some other examples, the hierarchical structure may comprise different regions of layers having the same layer thicknesses, the same numbers of layers, the same total thickness, or the like. Optionally, one or more additional layers, such as interlayers, may be positioned between the different regions of a hierarchical structure.

The composite foil materials may be incorporated into another structure, such as an electrochemical cell. For example, the disclosed composite foil materials may be useful as an anode material in an electrochemical cell, such as an electrochemical where the working ion is a cation of the active metal. For example, an electrochemical cell may comprise a cathode, an anode comprising the composite foil material, and an electrolyte between the cathode. Other components may also be included, such as a separator, one or more current collectors, or other conventional electrochemical cell components. In embodiments, the electrochemical cell may be a lithium ion cell or a sodium ion cell. Optionally, the composite foil materials may be subjected to a pressure, such as a pressure greater than ambient, atmospheric, or standard pressure. In some examples, the pressure may be applied by a case or coating around the composite foil material or the electrochemical cell. Application of pressure may be useful in some examples, as components of the composite foil material may undergo volumetric changes upon charging and/or discharging, and this volumetric change may be resisted and/or accommodated by the application of pressure.

The composite foil materials described herein may exhibit good performance as an anode. For example, the composite foil material may exhibit a gravimetric electrochemical capacity as an anode for uptake/discharge of cations of the active metal of from 100 mAh/g to 1000 mAh/g. Example gravimetric electrochemical capacities may be from 100 mAh/g to 200 mAh/g, from 200 mAh/g to 300 mAh/g, from 300 mAh/g to 400 mAh/g, from 400 mAh/g to 500 mAh/g, from 500 mAh/g to 600 mAh/g, from 600 mAh/g to 700 mAh/g, from 700 mAh/g to 800 mAh/g, from 800 mAh/g to 900 mAh/g, or from 900 mAh/g to 1000 mAh/g. As another example, the composite foil material may exhibit a volumetric electrochemical capacity as an anode for uptake/discharge of cations of the active metal of from 500 mAh/cm$^3$ to 2000 mAh/cm$^3$. Example volumetric electrochemical capacities may be from 500 mAh/cm$^3$ to 600 mAh/cm$^3$, from 600 mAh/cm$^3$ to 700 mAh/cm$^3$, from 700 mAh/cm$^3$ to 800 mAh/cm$^3$, from 800 mAh/cm$^3$ to 900 mAh/cm$^3$, from 900 mAh/cm$^3$ to 1000 mAh/cm$^3$, from 1000 mAh/cm$^3$ to 1100 mAh/cm$^3$, from 1100 mAh/cm$^3$ to 1200 mAh/cm$^3$, from 1200 mAh/cm$^3$ to 1300 mAh/cm$^3$, from 1300 mAh/cm$^3$ to 1400 mAh/cm$^3$, from 1400 mAh/cm$^3$ to 1500 mAh/cm$^3$, from 1500 mAh/cm$^3$ to 1600 mAh/cm$^3$, from 1600 mAh/cm$^3$ to 1700 mAh/cm$^3$, from 1700 mAh/cm$^3$ to 1800 mAh/cm$^3$, from 1800 mAh/cm$^3$ to 1900 mAh/cm$^3$, or from 1900 mAh/cm$^3$ to 2000 mAh/cm$^3$.

Methods are also described herein, such as methods of making and using the composite foil materials described herein. An example method may comprise providing a composite foil material and subjecting the composite foil material to an electrochemical alloying process. The electrochemical alloying process may correspond to a process in which the composite foil material is cycled in one or more charging operations, optionally followed by one or more discharging operations, as an anode of an electrochemical cell. For example, the first layers of the composite foil material may preferentially uptake and release cations of the active metal as compared to the second layers of the composite foil material during the electrochemical alloying process.

In one example, the electrochemical alloying process comprises subjecting the composite foil material to an electrochemical reaction with cations of the active metal at a charging potential and/or a charging current, for example such that the first layers preferentially react with cations of the active metal as compared to the second layers to form a charged composite foil material. The process may further comprise subjecting the charged composite foil material to a discharge process using a discharge current and/or discharging potential, for example such that the first layers preferentially release cations of the active metal as compared to the second layers to form a discharged composite foil material. The first layers of the discharged composite foil material may contain less of the active metal than in the first layers of the charged composite foil material. In an example, the first layers of the discharged composite foil material may contain an amount of the active metal that is up to 25% of the active metal that is present in the first layers of the charged composite foil material.

The charged and discharged composite foil materials may have different porosities. In some examples, the discharged composite foil material may have a porosity greater than that of the charged composite foil material. In a specific example, the discharged composite foil material may be characterized by a porosity of up to 50%, such as a porosity of from 0% to 5%, from 5% to 10%, from 10% to 20%, or from 20% to 50%.

In some examples, the discharge current may be greater than or equal to the charging current. For example, the discharge current may be from 2 to 2000 times the charging current. In examples, the discharge current is from 2 to 10 times the charging current, from 10 to 20 times the charging current, from 20 to 50 times the charging current, from 50 to 100 times the charging current, from 100 to 200 times the charging current, from 200 to 500 times the charging current, from 500 to 1000 times the charging current, or from 1000 to 2000 times the charging current.

The disclosed composite foil materials may be prepared by an accumulative roll bonding process. In one example, a layer of the first metal and a layer of the second metal may be roll bonded, forming a first roll-bonded structure. Different first roll-bonded structures may be overlapped and/or positioned adjacent to one another and then subjected to additional roll bonding, such as to form a second roll-bonded structure. Such first and/or second roll-bonded structures may be subjected to additional roll bonding. In some examples, a roll-bonded structure may be folded over itself and subjected to additional roll bonding. Stated another way, a first end of a roll-bonded structure may be positioned adjacent to a second end of the same roll-bonded structure and then subjected to roll bonding. Other layers may optionally be placed into a structure for roll bonding, such as interlayers, current collectors, or the like. The various roll bonding processes may result in a hierarchical multilayer structure comprising a composite metal foil material, such as those described above.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

DETAILED DESCRIPTION

Provided herein are multilayer composite foil materials including those comprising a plurality of alternating active electrode layers (first layers) and support layers (second layers) of different metals or alloys. The first layers can each comprise a first metal capable of alloying a working ion, also referred to herein as a cation of an active metal, (e.g., a working ion in the electrochemical cell into which the composite foil material will ultimately be accommodated). The second layers can each comprise one or more inactive metals that do not alloy with the working ion (e.g., under the normal operation/cycling of an electrochemical cell into which the metal foil will ultimately be accommodated).

Figure 1:
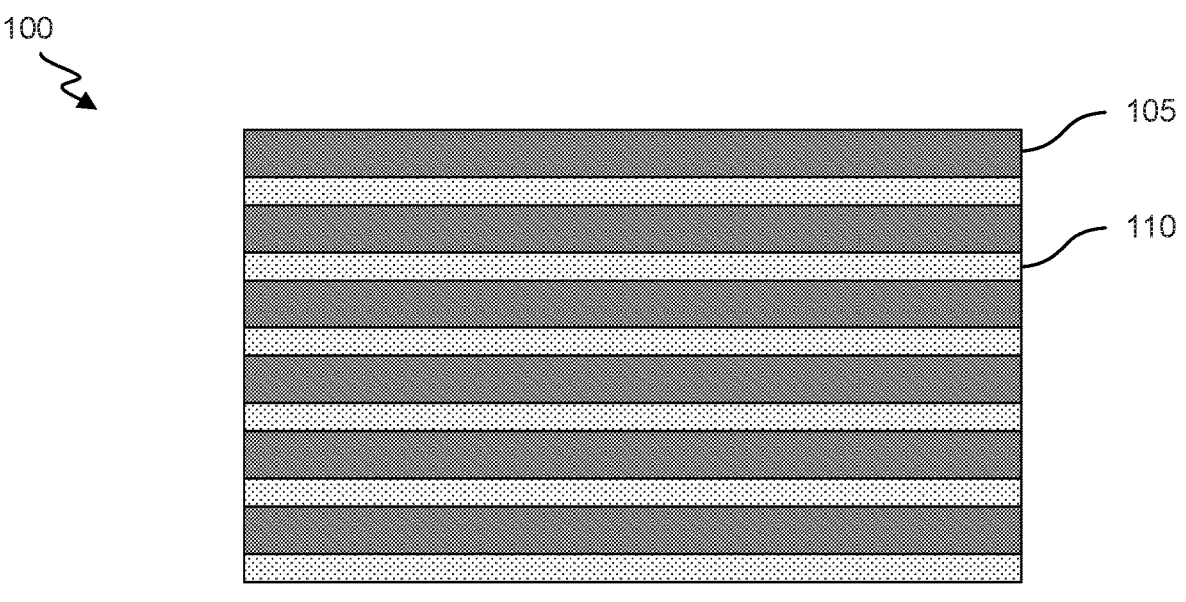
FIG. 1 shows a schematic illustration of an example multilayer composite foil material.

FIG. 1 provides a schematic illustration of an example composite foil material 100. Composite foil material 100 includes a plurality of first layers 105 and a plurality of second layers 110. First layers 105 and second layers 110 are shown in an interleaved or alternating configuration.

Figure 2:
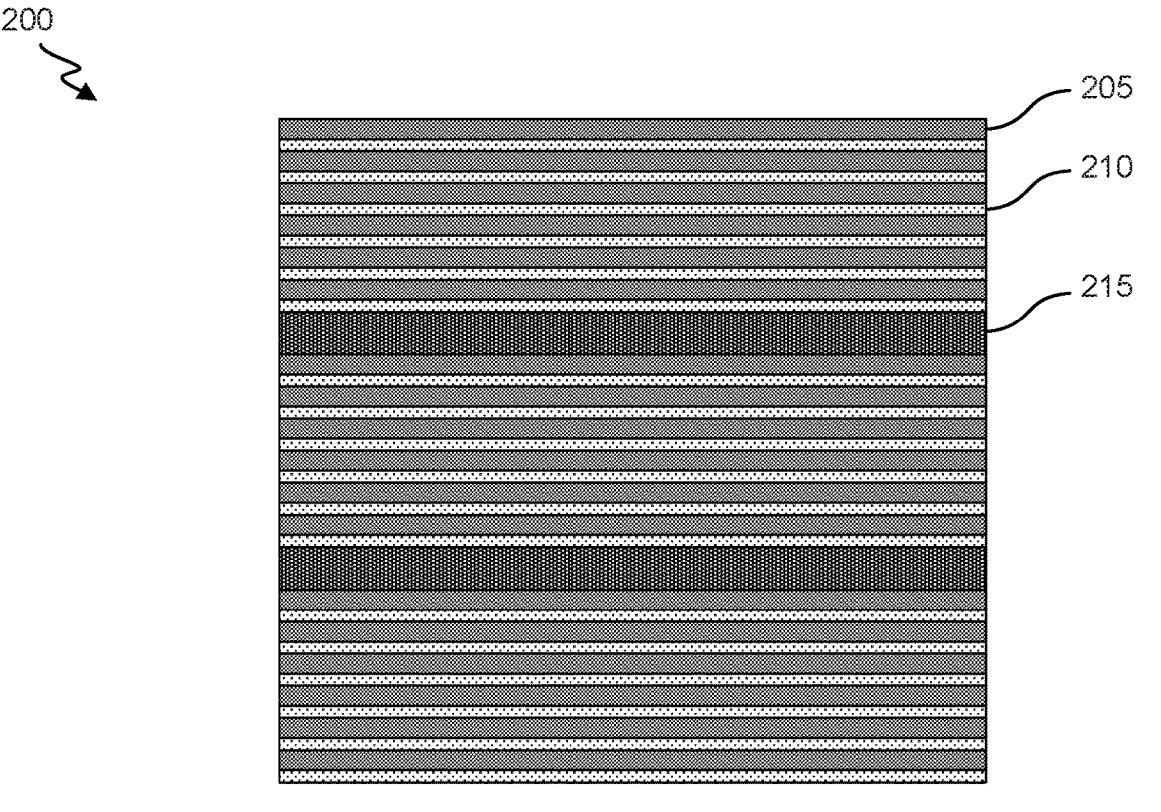
FIG. 2 shows a schematic illustration of another example multilayer composite foil material.

FIG. 2 provides a schematic illustration of another example composite foil material 200. Composite foil material 200 includes a plurality of first layers 205, a plurality of second layers 210, and a plurality of interlayers 215. Interlayers 215 are shown positioned between regions of alternating first layers 205 and second layers 210. The arrangement of layers of composite foil material 200 may be referred to as a hierarchical structure, as there are different thickness domains and compositional domains within different regions of the composite foil material 200, though other hierarchical structures may be used.

The composite foil materials can include any suitable number of alternating first layers and second layers. For example, in some embodiments, the composite foil materials can include from 3 to 512 first layers (e.g., from 12 to 512 first layers, or from 12 to 256 first layers), and from 3 to 512 second layers (e.g., from 12 to 512 second layers, or from 12 to 256 second layers). In some embodiments, each repeating pair of first layer and second layer can have a thickness from 0.05 μm to 5 such as from 0.25 μm to 1 μm.

In some embodiments, the first layers can comprise at least 50% (e.g., at least 55%, at least 60%, at least 65%, at least 70%, at least 75%, at least 80%, or at least 85%) of the total volume of the composite foil material. In certain embodiments, the first layers comprise from 50% to 90% (e.g., from 70% to 90%) of the total volume of the composite foil material.

Working Ions. In some embodiments, the working ion can comprise a Group I or II metal. In certain embodiments, the working ion can comprise lithium, sodium, potassium, calcium, zinc, or magnesium. The working ion may be a cation of a metal, referred to herein as an active metal.

The composition of the first layer and the second layer, including the identity of the one or more active metals and/or the one or more inactive metals incorporated in the first layer and/or the second layer, can be selected based on the identity of the working ion (e.g., the working ion in the electrochemical cell into which the composite foil material will ultimately be accommodated) as discussed below.

First Layer. The first layer can comprise a first metal capable of alloying a working ion (under the operating conditions in which the foil (and resulting anode comprising the foil) will be used in an electrochemical cell). Appropriate metals can be selected based on their alloying potentials with the intended working ion. By way of example, the table below includes suitable first metals for use in conjunction with a lithium working ion (e.g., for a foil to be used in an anode in a Li-ion battery), a sodium working ion (e.g., for a foil to be used in an anode in a Na-ion battery), and a magnesium working ion (e.g., for a foil to be used in an anode in a Mg-ion battery). Suitable first metals (and by extension inactive metals) can similarly be provided for other suitable working ions.

8

| Lithium | | | | |
|---|---|---|---|---|
| First Metals | Theoretical Capacity | Lithium Alloying Potential (measured relative to metallic Li) | | |
| Al | 993 | 0.19 | | |
| Si | 3579 | 0.07 | 0.22 | 0.49 |
| Zn | 410 | 0.06 | 0.19 | 0.21 |
| Ga | 769 | 0.25 | 0.52 | 0.82 |
| Ag | 248 | 0.04 | 0.1 | 0.26 | 0.38 |
| Cd | 238 | | | |
| In | 1012 | | | |
| Sn | 960 | 0.4 | 0.57 | 0.69 |
| Sb | 660 | 0.78 | 0.83 | 0.99 |
| Au | 510 | | | |
| Pb | 550 | 0.292 | 0.374 | 0.449 | 0.601 |
| Bi | 385 | 0.73 | 0.78 | |
| Mg | 195 | 0.24 | | |

| Sodium | | | | |
|---|---|---|---|---|
| First Metals | Theoretical Capacity | Sodium Alloying Potential (measured relative to metallic Na) | | |
| Ga | 217 | | | |
| Ag | 124 | | | |
| Cd | 596 | | | |
| In | 467 | | | |
| Sn | 847 | 0.2 | 0.3 | 0.57 | 0.69 |
| Sb | 660 | 0.78 | | |
| Au | 272 | | | |
| Pb | 485 | 0.12 | 0.183 | 0.37 | 0.51 |
| Bi | 385 | 0.4 | 0.6 | |

| Magnesium | | | |
|---|---|---|---|
| First Metals | Theoretical Capacity | Magnesium Alloying Potential (measured relative to metallic Mg) | |
| Al | 2814 | | |
| Si | 3817 | 0.15 | |
| Zn | 820 | | |
| Ga | 1922 | | |
| Ag | 1491 | | |
| Cd | 1430 | | |
| Sn | 903 | 0.15 | |
| Sb | 293 | 0.32 | |
| Pb | 517 | | |
| Bi | 385 | 0.23 | |

In some embodiments, the working ion can comprise lithium and the first metal can comprise aluminum, silicon, zinc, gallium, silver, cadmium, indium, tin, antimony, gold, lead, bismuth, or magnesium.

In some embodiments, the working ion can comprise sodium and the first metal can comprise gallium, silver, cadmium, indium, tin, antimony, gold, lead, or bismuth.

In some embodiments, the working ion can comprise magnesium and the first metal can comprise aluminum, silicon, zinc, gallium, silver, cadmium, tin, antimony, lead, or bismuth.

In some embodiments, the first layers can further comprise an additional metal. The additional metal can exhibit a higher alloying potential for the working ion than the first metal. In some embodiments, the additional metal can comprise tin, antimony, lead, or bismuth. The weight ratio of the first metal to the additional metal can be from 5:1 to 100:1, such as from 10:1 to 40:1.

In certain embodiments, the first metal can comprise tin, and the additional metal can comprise antimony, lead, bismuth, or a combination thereof.

Optionally, the first layers can further comprise an inactive metal that does not alloy with the working ion. The weight ratio of the first metal to the inactive metal can be from 5:1 to 100:1, such as from 10:1 to 40:1.

In some embodiments, the first layers can further comprise nanoparticles. The nanoparticles can comprise, for example, a metal oxide, metal carbide, or a carbonaceous material.

In some embodiments, the first layers can comprise void spaces.

In some embodiments, the first layers can be continuous. In other embodiments, the first layers can be partially discontinuous.

Second Layers. The second layers can each comprise one or more inactive metals that do not alloy with the working ion (e.g., under the normal operation/cycling of an electrochemical cell into which the composite foil material will ultimately be accommodated). In some cases, the one or more inactive metals can comprise an inactive metal present in the form of an intermetallic compound.

In some embodiments, the one or more inactive metals can comprise aluminum, silicon, zinc, cadmium, silver, copper, nickel, cobalt, iron, manganese, chromium, vanadium, titanium, magnesium, zirconium, lanthanum, cerium, or a combination thereof. In some examples, the first metal in the first layers can comprise tin, and the one or more inactive metals in the second layers can comprise aluminum, selenium, zinc, cadmium, silver, nickel, copper, cobalt, iron, manganese, magnesium, zirconium, niobium, lanthanum, cerium, or a combination thereof. In certain examples, the first metal in the first layers can comprise tin, and the one or more inactive metals in the second layers can comprise copper, iron, nickel, zinc, aluminum, magnesium, manganese, or a combination thereof.

Optionally, in some embodiments, the second layers can further comprise an additional metal, which may be active toward the working ion. The weight ratio of the one or more inactive metals in the second layers to the additional metal in the second layers can be from 5:1 to 100:1, such as from 10:1 to 50:1.

Optionally, in some embodiments, the second layer further comprises an elemental form of the working ion (e.g., Li metal, Na metal, Mg metal, etc.).

The one or more inactive metals can comprise the majority component of the second layers. In some embodiments, the second layers can comprise at least 80%, by volume, (e.g., at least 85% by volume, or at least 90% by volume) of the one or more inactive metals.

In some embodiments, all of the second layers within the multilayer composite foil material can have the same composition. In other embodiments, different second layers within the multilayer foil can have different compositions. For example, in some embodiments, some second layers can have a first composition and some second layers can have a second composition. In some of these embodiments, the first composition and the second composition can comprise different inactive metals.

In some embodiments, the second layers can comprise void spaces.

In some embodiments, the second layers can be continuous. In other embodiments, the second layers can be partially discontinuous.

Figure 3A:
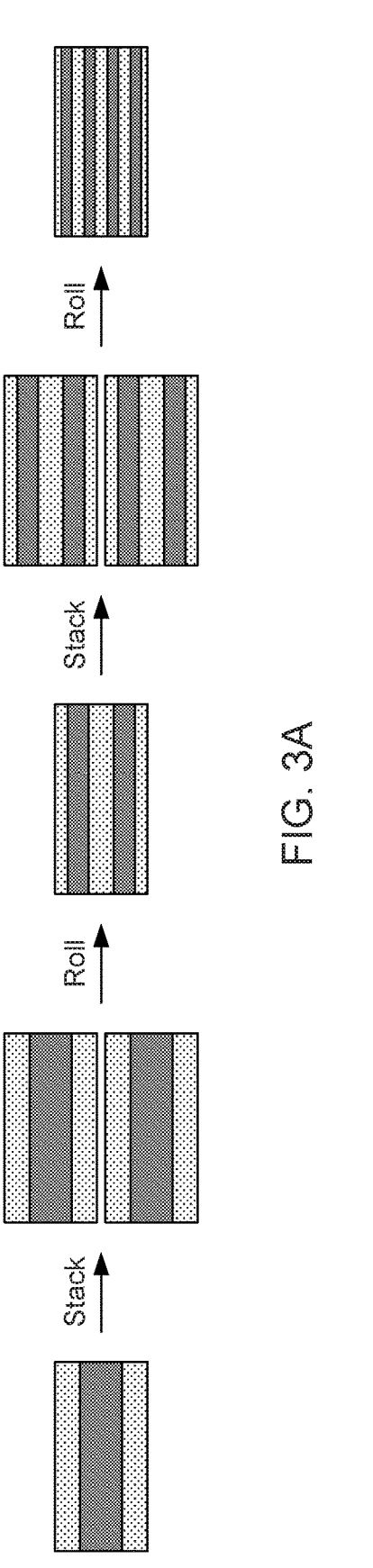
FIG. 3A shows a schematic representation of the accumulative roll bonding (ARB) process (depicting stacking and cladding of precursors to form a 4 layered composite) and FIG. 3B provides EDX micrographs showing the progression of a 200 micron Sn/Cu composite foil at 2, 4, 8, 16, and 32 layers.

Multilayer composite foil material fabrication. FIG. 3A provides a schematic overview of a process of forming a composite foil material in accordance with some embodiments. An accumulative roll bonding process can be used to bond multiple layers of different metals together. For example, a stack of two first layers and one second layer can be roll bonded to form a first roll-bonded structure 305. Following this, multiple first roll-bonded structures 305 are stacked and then subjected to roll bonding to form a second roll-bonded structure 310. Following this, multiple second roll-bonded structures 310 are stacked and then subjected to roll bonding to form a third roll-bonded structure 315. In this way, foils of a multiple roll-bonded structure can comprise many individual layers. In some cases, two lateral sides of a single foil or roll-bonded structure can be folded over each other in lieu of stacking separate foil or roll-bonded structures.

Figure 3B:
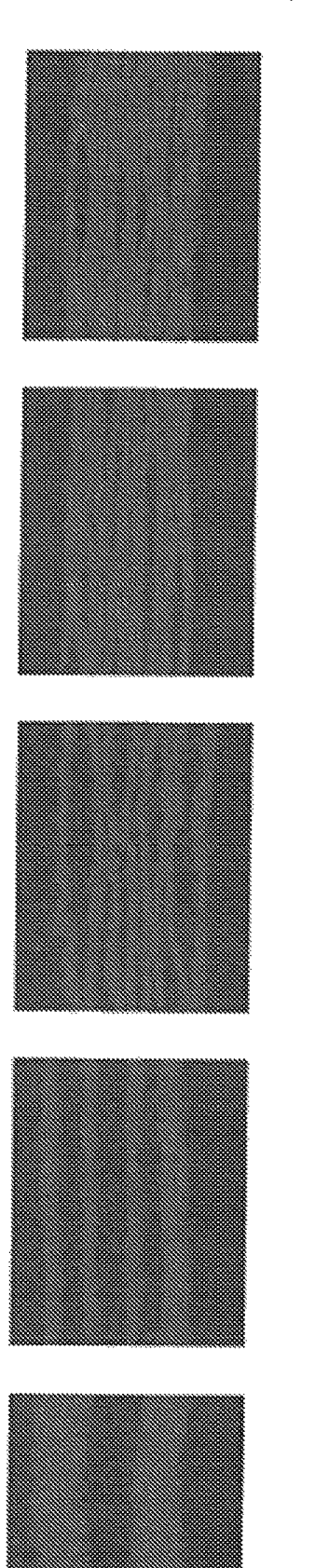

FIG. 3B provides a series of EDX micrographs, showing the progression of accumulative roll bonding of tin-based first layers and copper-based second layers to form composite foil material with progressively more layers.

Anodes and Electrochemical Cells. The multilayer composite foils materials described herein can be used to fabricate anodes for use in electrochemical cells.

Figure 4:
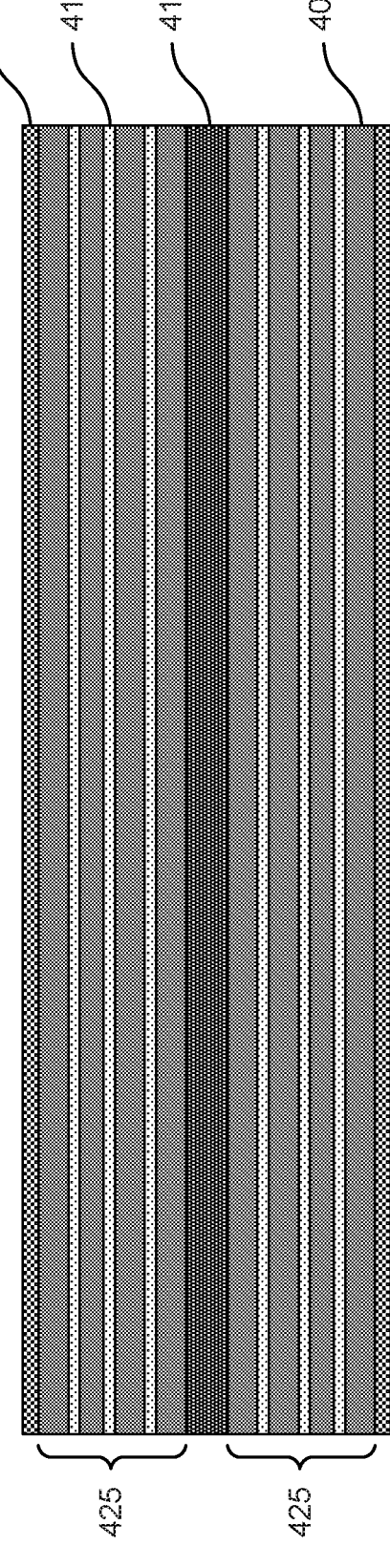
FIG. 4 is a schematic illustration of an anode comprising a composite foil material described herein.

Accordingly, also provided are anodes that comprise a multilayer composite foil material described herein in electrical communication with a current collector. FIG. 4 shows an example multilayer composite foil material-based anode 400. As shown, anode 400 comprises two regions 425 of a composite foil material, each comprising multiple first layers 405 and multiple second layers 410. A current collector 415 is also shown, and can comprise a central support layer disposed within the anode 400. In some embodiments, the composite foil material regions 425 can be symmetrically disposed about the current collector 415, as shown in FIG. 4. In some examples, the current collector 415 has a thickness from 0.1 μm to 10 μm. A surface coating 420 is shown on both sides of anode 400.

In some cases, multiple current collectors 415 can be used and more regions 425 of composite foil material can be used. Although both regions 425 of composite foil material shown in FIG. 4 have the same general structure, in some embodiments different regions 425 of composite foil material can have different dimensions, compositions, layer thicknesses, etc.

In some embodiments, a current collector in a composite metal foil material-based anode comprises an inactive metal. For example, in some embodiments, the current collector can comprise aluminum, silicon, zinc, cadmium, silver, copper, nickel, cobalt, iron, manganese, chromium, vanadium, titanium, magnesium, zirconium, lanthanum, cerium, or a combination thereof.

In some embodiments, the current collector can optionally further comprise an elemental form of the working ion (e.g., Li metal, Na metal, Mg metal, etc.). When present, the elemental form of the working ion can comprise up to about 50 wt. % of the current collector.

As described above, the composite foil material can optionally comprise a coated surface. Example coatings include an ionically conductive surface coating. An ionically conductive surface coating can have a high ionic conductivity for the working ion, for example. An ionically conductive surface coating can be useful for preventing an electrolyte from penetrating into the composite foil material, for example.

In some examples, the ionically conductive surface coating can comprise an inactive metal, a conductive polymer, a conductive glass, a ceramic material, or any combination thereof.

In some embodiments, the ionically conductive surface coating can have a thickness less than 1 μm (e.g., a thickness of from 1 nm to 1 μm).

As discussed above, the anodes described herein can be incorporated into electrochemical cells. Accordingly, also provided are electrochemical cells that comprise an anode described herein, a cathode, and an electrolyte disposed between the anode and the cathode.

In some cases, the electrolyte can comprise a propylene carbonate-based electrolyte.

Anode Compositions and Structures. Example anodes can include one or more of the features described herein. Many of the examples described herein have focused upon designing the bulk of the composite foil, which comprises alternating first layers and second layers. An example anode is schematically illustrated in FIG. 4 and described above.

Bulk: A plurality of alternating first layers and second layers between the current collector and an optional surface coating, where the bulk comprises about 70-100% of the total volume of the foil.

The first layers may be continuous or partially discontinuous along the x-y plane, and the second layers may be continuous or partially discontinuous along the x-y plane. In general, the first layers may be continuous, but in some cases the second layers may be discontinuous.

The thickness of each pair of alternating first layer/second layer can be from about 50 nm to about 10 μm, such as from about 250 nm to about 2.5 μm.

The volume ratio of first layers to second layers can be from about 1:1 and 20:1, such as from about 3:1 to 10:1.

The addition of alloying agents can provide mechanical compatibility between layers. The addition of alloying agents can also improve working ion diffusivity.

First Layer: The first layer can primarily comprise one or more active metals and may optionally contain one or more inactive metals, as described above.

This layer can include alloyed elements to tune the mechanical properties of the material.

This layer can include at least two active metals wherein the second active metal has a higher lithiation potential and is present at a low concentration (e.g., about 1-10%).

This second active metal can be in the form of nanoparticles or a solid solution. For example, the inclusion of 8 wt. % Sb in Sn can dramatically improve lithium insertion/extraction kinetics.

Optionally, this layer can also contain distinct inactive phases to further refine the active alloying components.

Second Layer: The second layer can predominately comprise one or more inactive metals. The second layer can provide mechanical integrity during cycling. Optionally, one or more other metals can be included, for example, in an amount of from about 0.1 wt. % to about 10 wt. %.

This layer may include additional active or inactive metals to improve diffusion, either via their intrinsic diffusivity or by the introduction of grain boundaries/dislocations/voids.

Current Collector: A continuous, relatively thick (>1 μm) support layer (second layer type layer) at the center of the foil can act as a current collector to transport electrons along the x-y axis of the foil, as well as providing improved mechanical integrity along the x-y axis.

This layer can predominately comprise inactive metals so that the mechanical integrity of the layer would not be compromised during cycling of the battery.

This layer may optionally include a quantity of metallic lithium (e.g., up to about 50 wt. %), such that it can act as an additional lithium reservoir to replenish the lithium which is lost due to parasitic reactions with the electrolyte. This can provide for significantly improved cycle life of the anode foil. The lithium would be replaced by Na for Na-ion batteries, Mg for Mg-ion, etc.

Surface Coating: Optionally, a thin (<1 μm) surface coating can be incorporated on one or both sides of a composite foil material. The coating can have high ionic conductivity for the working ion (Li, Na, Mg, etc.). The coating may or may not be electronically conductive.

The coating can be mechanically robust and substantially impermeable to electrolyte molecules to prevent electrolyte from penetrating into the bulk of the foil, thus improving columbic efficiency and cycle life.

The coating can comprise metals (in which case they can be predominately "inactive metals"), ionically conductive polymers, or ionically conductive glass, or ceramic materials.

The coating can be mechanically clad or physically, chemically, or electrochemically deposited onto the surface of the anode foil.

By way of non-limiting illustration, examples of certain embodiments of the present disclosure are given below.

Example 1—Multilayer Composite Foil Materials

Described herein are multilayer composite foil materials, as well as methods of making these foils. These composite foil materials can be used as anodes for rechargeable batteries. First, a metal precursor is synthesized with at least one phase that can electrochemically form alloys during battery operation. This precursor is then processed by severe plastic deformation such that there is significant reduction in domain size of the electrochemically active phase. Finally, the nanostructured material is transformed into a composite foil material. The resulting composite foil materials can accommodate the stresses associated with electrochemical alloying, and act as a high-capacity anode material for rechargeable batteries.

An example of this is a Cu/Sn composite foil material, discussed below in Example 2. Briefly, a mixed metal precursor is formed by cold-bonding copper foils to a tin foil. The precursor is then processed by repeated stacking and cladding in a severe plastic deformation process known as accumulative roll bonding (ARB), resulting in a multilayered copper/tin nanocomposite with between 1 and >4096 tin layers. This layering could be equivalently achieved by the stacking and cladding of many metal precursors, rather than the accumulative roll bonding of a single metal precursor. Before or after each stage in the process described above, materials may be annealed, additional phases may be incorporated, and material surfaces may be modified via polishing, degreasing, wire-brushing, anodizing, electroplating, metallizing, coating with polymers, or treating with chemical baths. Porosity may be introduced into the material via the Kirkendall Effect.

In secondary batteries, charge is stored via a working ion, such as Li, Na, K, Mg, Ca, or Zn. The composite foil materials contains at least one phase that electrochemically alloys with the above working ions, such as Sn, Mg, Si, Bi, Al, Pb, Ag, In, Cd, Ga, or P. Additional phases need not electrochemically alloy, and can include ductile materials such as Cu, Al, Mg, Zn, Li, In, Pb, Cd, Ag, Nb, Ni, Ti, V, or Fe. The composition of each phase may be independently tuned to optimize performance by the addition of alloying elements including Li, Be, Na, Mg, K, Ca, B, C, Al, Si, P, S, Ga, Ge, As, In, Sn, Sb, Pb, Bi, Ti, V, Cr, Mn, Mg, Fe, Co, Ni, Cu, Zn, Y, Zr, Nb, Mo, Tc, Ru, Rh, Pd, Ag, Cd, W, Os, Ir, Pt, Au, or Ce, or via the addition of particles including SiO, $SiO_2$, $Al_2O_3$, SiC, $ZrO_2$, $TiO_2$, FeO, $Fe_2O_3$, $Fe_3O_4$, $SnO_2$, hard carbons, graphitic carbons, nanostructured carbons, or carbon fibers. The metal precursor may be synthesized by casting, cladding, electroplating, doping, or sintering of the above materials, or any combination of those techniques. Accumulative roll bonding may be performed via either hot-rolling or cold-rolling, with or without lubrication of the rollers. Pack rolling may also be utilized. Domain size of the metal precursor may be reduced via an alternative severe plastic deformation technique such as equal channel angular pressing or high pressure torsion, and subsequently processed into a foil.

The described alloying elements can serve a variety of roles, including the addition of auxiliary phases to refine a primary phase (example: Zn→Sn, Ag→Cu), the addition of solutes or intermetallic compounds to more closely match the mechanical properties of phases (example: Bi→Sn, Li→Mg), the addition of alloying elements to improve bond strength upon cladding (example: Cu→Sn, Sn→Cu), the addition of alloying elements to improve corrosion resistance of a phase (example: Cu→Sn, Cr→Cu), or the addition of an electrochemically active element to provide accessible capacity (example: Li→Cu, Li→Mg). In this last case, the elements may also be added to the processed anode material via diffusion or electrochemical insertion. The presence of a refining phase can further reduce active material domain size, and the introduction of interphasial boundaries enables rapid diffusion.

Another example, discussed below in Example 3, is a Sn/Cu multilayer composite foil material. One procedure involves casting a 86% Sn, 12% Zn, 2% Bi alloy. This alloy is rolled from ~3 mm into a ~200 micron foil and coated in a thin film of Cu via electroplating. The metal precursor is formed via cold-bonding of 10 micron copper foils to each side of the Sn foil, resulting in a ~100 micron Cu/Sn/Cu composite. The accumulative roll bonding process is then performed 5 times, resulting in a ~100 micron composite with ~32 alternating layers of tin/copper. The foil is then reduced in thickness to ~20 microns and utilized as an anode.

As specific modifications of the system described above, formation of the metal precursor by electrodeposition of the copper phase upon a tin-zinc foil, or electrodeposition of the tin-zinc phase upon a copper foil are potentially promising. Beyond the Sn/Cu system, the Sn/Mg is highly promising, particularly the Sn/Mg(Li) system. Accumulative roll bonding can be a preferred plastic deformation technique, though others may be used.

Nanocomposite foils with sub-micron feature size can overcome cycling stresses, ensuring structural integrity upon cycling. These anodes can offer significant improvements to anode capacity, with demonstrated capacities exceeding 800 mA h $cm^{-3}$.

Without wishing to be bound by theory, it is believe that this performance results from the use of severe plastic deformation to reduce the size scale of the active alloying domains. Severe plastic deformation was developed to create composite materials with nanoscale feature size for use in structural applications, but has not been investigated for the production of energy materials. In some embodiments, discrete metals are repeatedly rolled and folded together until there is significant reduction in domain size. The result is a composite foil that includes nanoscale layers that can accommodate cycling stresses.

The multilayer composite foil materials described herein allow for the use of high-capacity anode materials, offering improvements to battery energy density. Additionally, the adoption of this architecture offers significant benefits beyond improved capacity. Use of this anode system eliminates the primary risk of catastrophic battery failure at high-rate cycling (lithium plating). Further, by eliminating electrode slurry-coating and drying, expensive processing steps (which account for 80% of conventional electrode processing costs) can be eliminated. With no graphite, the system can utilize a safer propylene carbonate-based electrolyte with reduced flammability and freezing point.

Composite Foils Including Magnesium Alloys. Multilayer composite foils have been prepared using a magnesium-lithium composite supporting matrix. These composite foils comprise alternating Sn/Mg—Li layers; they have demonstrated very impressive performance. In some examples, the tin phase contains 90% tin, 5% antimony, 3% copper, and 2% bismuth (all fractions given by weight). The magnesium-lithium contains 12.5% lithium. Composites with 8, 16, and 32 layers have been investigated.

Inactive Phase. The magnesium-lithium matrix is a soft, ductile metal. Thus, it is a close hardness match for the tin or tin alloys, which are relatively soft. This hardness match enables the synthesis of much finer microstructures than may be achievable using copper, potentially allowing for composites with 64, 128, or 256 uniform layers. It also contains lithium, an attractive characteristic for a battery anode. While most methods of prelithiation (incorporating lithium into the anode) require complex processes or air-sensitive components, incorporation of lithium via incorporation of magnesium-lithium can be achieved by the accumulative roll-bonding process and can be carried out in air.

There are three parent classes of magnesium-lithium alloys. Alloys with less than 8% lithium have one crystal structure (HCP), alloys with greater than 12% lithium have another crystal structure (BCC), and alloys with between 8-12% lithium have a mixture of both. All three classes may have potentially attractive properties. As the lithium-content further increases, the alloy may be less air-stable, but prelithiate the anode to a greater extent. Additional alloying elements can optionally be added to these Mg—Li alloys to further tune properties, if desired.

However, the magnesium-tin composite foils may have lower mechanical integrity due to the formation of a MgSn or MgSnLi intermetallic at the interface, resulting in layers of Sn/MgSn/Sn/MgSn/Sn. For this reason, in some embodiments, the first layer and the second layer are spatially separated by an interlayer.

Active Phase. For the tin phase, additive alloying elements can be added to harden the phase. The specific ratio can be varied. One class of tin described herein may be referred to as pewter. A huge variety of alloying elements can be added to pewter, including antimony, copper, bismuth, silver, and lead.

Not all implementations of composite foils require pewter. In other cases, the addition of antimony (the element that alloys at a higher potential than tin) was used to achieve adequate performance. However, pewter may still be useful, especially when combined with the formation procedure described below in Example 9.

Example 2—Tin/Copper Composite Foil Material

Approximately 50 grams of the desired weight ratios of tin, zinc, and bismuth were melted in air at 700° C. to form a tin alloy of the composition 86Sn-12Zn-2Bi. The melt was then cast into a graphite mold and allowed to cool in a rectangular mold 25 mm×25 mm×100 mm in size. This section was anisotropically cold-rolled with a Durston mill to form a tin alloy foil with a thickness of 180 microns.

A stack of 10 micron copper foil/180 micron tin alloy foil/10 micron copper foil was then rolled such that there was a 50% reduction in thickness. This laminated tri-layer was then folded in half, and again rolled such that the total thickness was reduced from 200 microns to 100 microns. This process was repeated until the desired number of layers had been introduced to the composite. Finally, the thickness of the multi-layer composite was reduced to the desired thickness of 25 microns.

This composite foil was then placed in direct contact with lithium metal and a 1 M solution of lithium-hexafluorophosphate in propylene carbonate with 5 wt. % monofluoroethelyne carbonate for 45 minutes. This process served to insert active metal into the foil, mitigating the reversible trapping phenomena that occurs during shallow cycling of many tin foils.

Figure 5:
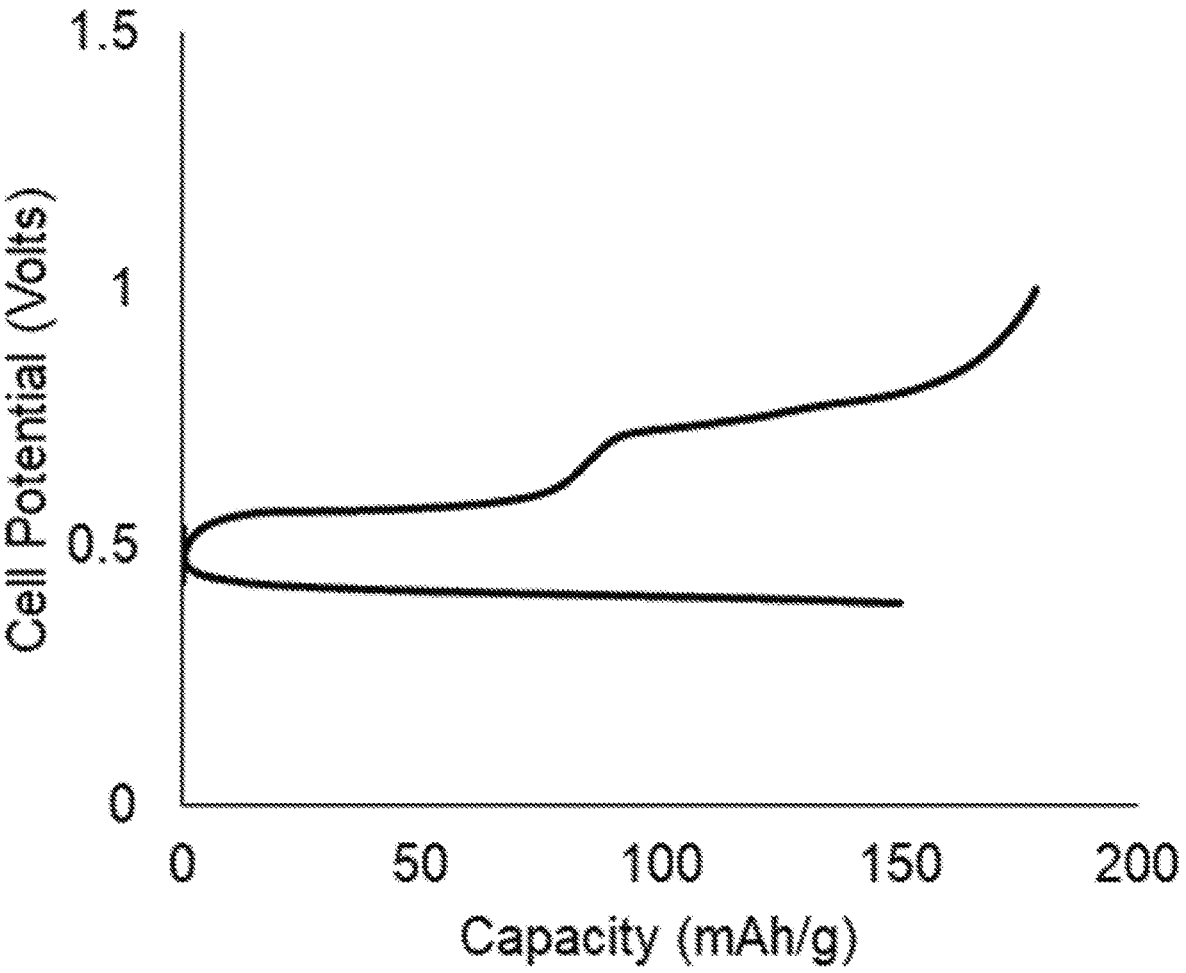
FIG. 5 provides a plot showing a voltage profile corresponding to the first charge-discharge cycle of a prelithiated SnZnBi/Cu composite foil cycled against lithium-metal.

The lithiated composite foil material was then assembled into an electrochemical cell. A lithium-metal foil was used as a counter electrode, and a polypropylene membrane was used as the separator. The cell was flooded with a 1 M solution of lithium-hexafluorophosphate in propylene carbonate with 5 wt. % monofluoroethelyne carbonate and cycled using a traditional galvanostatic profile at a rate of C/10. The voltage profile of the first cycle is reproduced in FIG. 5, demonstrating the successful prelithiation of the tin material.

Example 3—Tin/Copper Composite Foil Material

Approximately 50 grams of the desired weight ratios of tin, antimony, copper, and bismuth were melted in air at 700° C. to form a tin alloy of the composition 88Sn-5Sb-5Cu-2Bi. The melt was then cast into a graphite mold and allowed to cool in a rectangular mold 25 mm×25 mm×100 mm in size. This section was anisotropically cold-rolled with a Durston mill to form a tin alloy foil with a thickness of 200 microns. This foil was sealed in an aluminized pouch, solution-treated at 200° C., and then precipitation hardened at 100° C. for 24 hours. This demonstrates the ability to manipulate the microstructure of each precursor metal separately.

The tin alloy foil was first degreased in acetone. It was then submerged into a solution of 0.1 M CuSO₄, 0.125 M EDTA, and 0.25 M NaOH for 1 minute at 60° C. The ensuing chemical reaction resulted in the self-passivating formation of a copper surface-coating. This demonstrates a chemical process by which an interlayer can be introduced.

A stack of 10 micron copper foil/180 micron tin alloy foil/10 micron copper foil was then rolled such that there was a 50% reduction in thickness. This laminated tri-layer was then folded in half, and again rolled such that the total thickness was reduced from 200 microns to 100 microns. This process was repeated until the desired number of layers had been introduced to the composite. Finally, the thickness of the multi-layer composite was reduced to the desired thickness of 25 microns.

The tin alloy/copper composite foil was then degreased in acetone. It was then submerged into a solution of 0.1 M CuSO₄, 0.125 M EDTA, and 0.25 M NaOH for 1 minute at 60° C. The ensuing chemical reaction resulted in the self-passivating formation of a copper surface-coating. This demonstrates one possible surface treatment for a composite foil anode.

Figure 6:
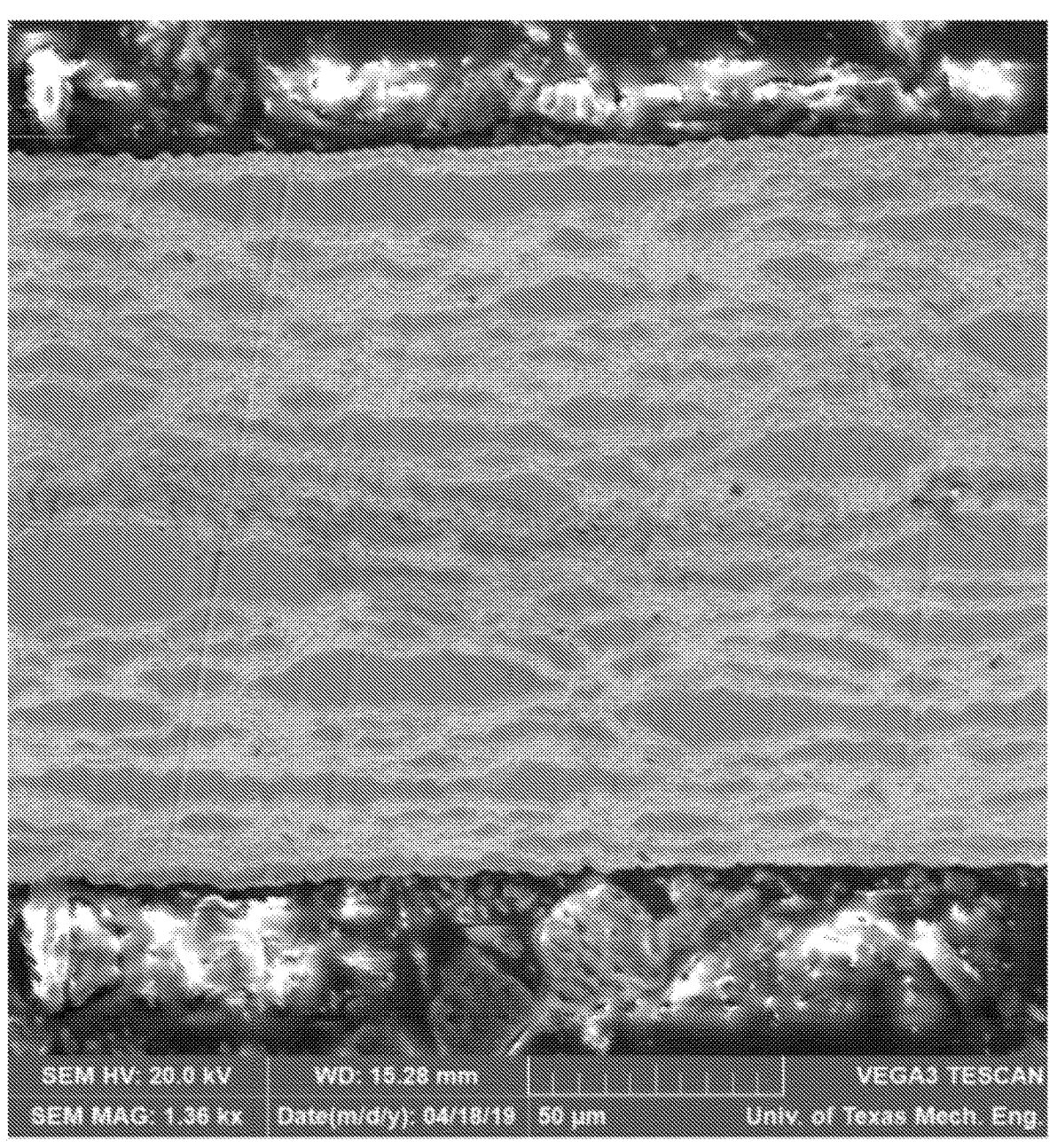
FIG. 6 shows a cross-sectional electron micrograph image of a multilayer composite foil material comprising alternating layers of Cu and 88Sn-5Sb-5Cu-2Bi.

FIG. 6 shows a cross-sectional electron micrograph image of the resulting composite foil material. The image shows alternating layers of Cu/88Sn-5Sb-5Cu-2Bi. Discontinuous copper layers (dark phase), and tin alloy layers (light phase) are shown. The tin alloy layers are composed of a tin/ bismuth/antimony solid solution, $Cu_6Sn_5$ intermetallic compounds, and SnSb intermetallic compounds. For use of such a composite foil as an anode in a lithium ion electrochemical cell, the thickness be between 20 μm and 100 μm.

Figure 7:
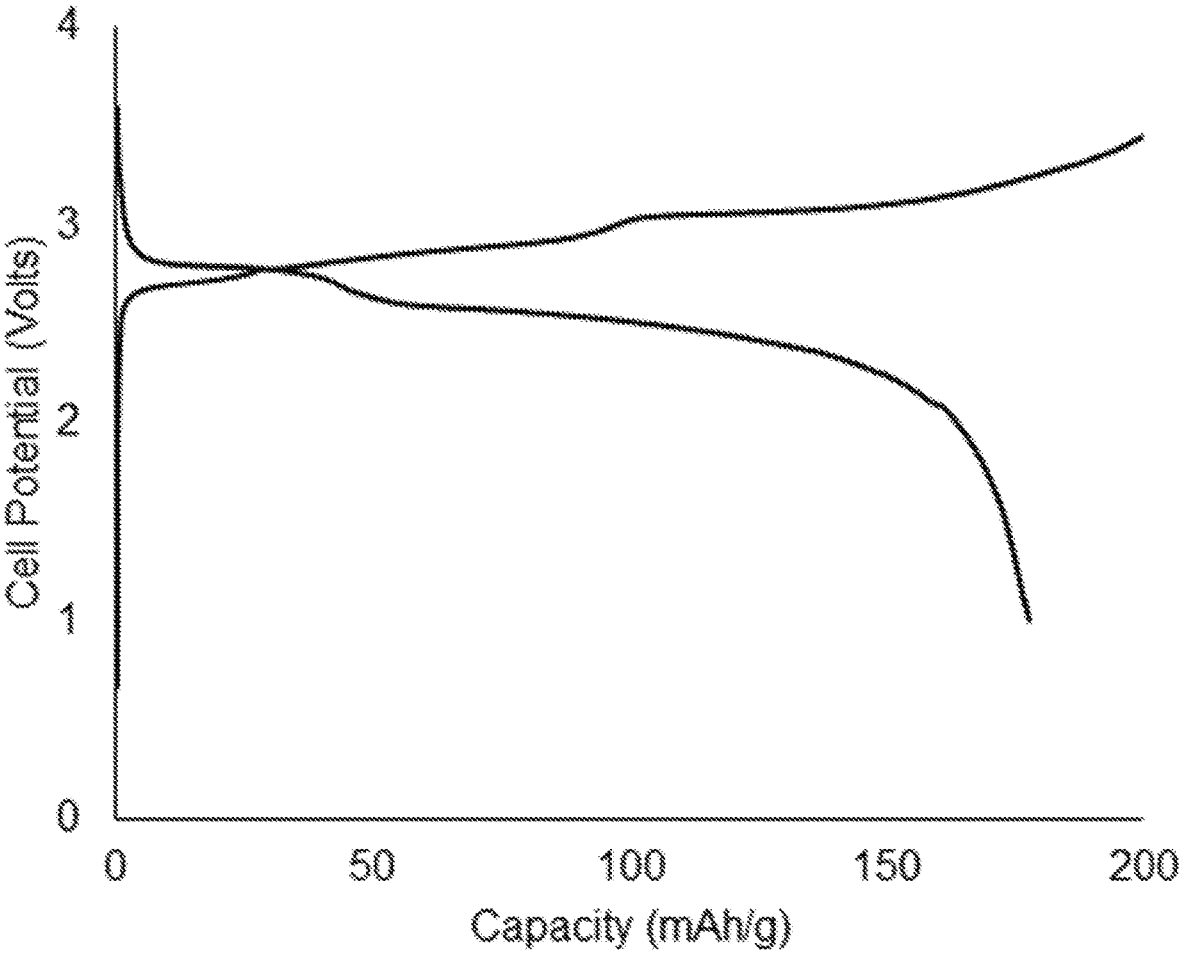
FIG. 7 provides a plot showing a voltage profile corresponding to the first charge-discharge cycle of an 88Sn-5Sb-5Cu-2Bi/Cu composite foil anode.
Figure 8:
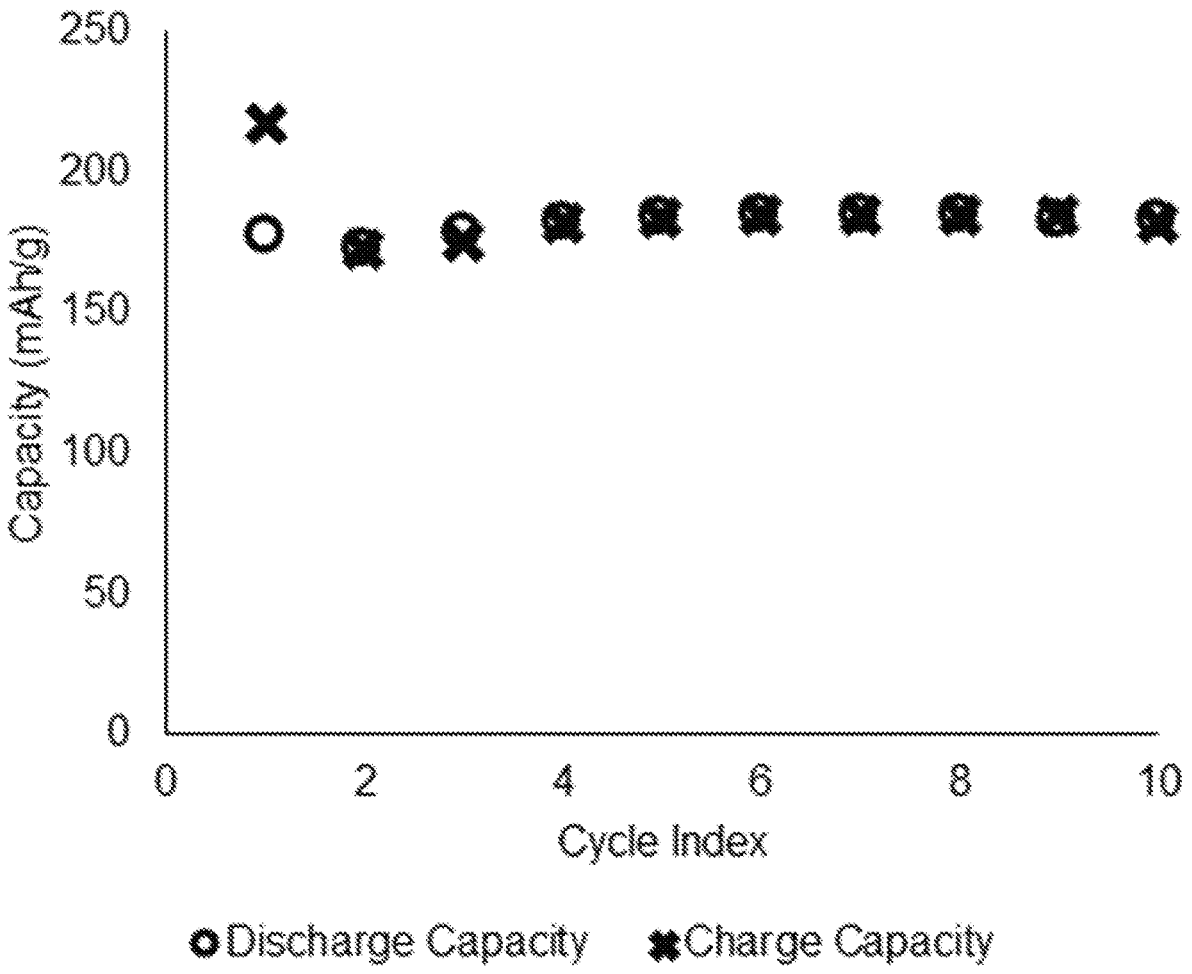
FIG. 8 provides data showing cycling stability of a lithium ion battery comprising an 88Sn-5Sb-5Cu-2Bi/Cu composite foil anode and a lithium iron phosphate cathode.

The composite foil material was then rolled down to 20 microns in thickness and assembled into an electrochemical cell. An aluminum foil coated with lithium iron phosphate (LFP) was used as the cathode, and a polypropylene membrane was used as the separator. The cell was flooded with a 1 M solution of lithium-hexafluorophosphate in a mixture of ethylene carbonate and ethyl methyl carbonate and cycled using a traditional galvanostatic profile at a rate of C/10. The voltage profile of the first cycle is shown in FIG. 7. This example demonstrates that the doping of tin with antimony eliminates the reversible trapping phenomena that presents in many tin foils, allowing for direct assembly into a lithium-limited full cell system. The first ten cycles of the 88Sn-5Sb-5Cu-2Bi/Cu—LFP battery are shown in FIG. 8.

Example 4—Tin/Magnesium-Lithium Composite Foil Material

Approximately 50 grams of the desired weight ratios of tin, antimony, copper, and bismuth were melted in air at 700° C. to form a tin alloy of the composition 88Sn-5Sb-5Cu-2Bi. The melt was then cast into a graphite mold and allowed to cool in a rectangular mold approximately 25 mm×25 mm×100 mm in size. The ingot was subsequently solution treated at 200° C., and then cut into a section 25 mm×25 mm×10 mm. This section was anisotropically cold-rolled with a Durston mill to a thickness of 200 microns.

Approximately 8.6 grams of magnesium and 1.4 grams of lithium were melted together in a silicon carbide crucible under an argon atmosphere and cast into a graphite mold approximately 25 mm×25 mm×100 mm in size to form a magnesium alloy having a composition of approximately 86Mg-14Li. This metal was then cut into a section 25 mm×25 mm×10 mm, and anisotropically cold-rolled such that there was a 50% reduction in thickness. At this point, the foil was annealed under argon at 300 degrees for one hour. The foil was then anisotropically cold-rolled down to a thickness of 100 microns, and again annealed under argon at 300 degrees for one hour.

The surface of the magnesium alloy foil was first degreased using acetone, and mechanically polished using abrasives. A 200 nm coating of gold was deposited onto the surface of the foil using a vacuum deposition chamber. This demonstrates another means by which an interlayer can be deposited.

A stack of 200 micron tin alloy foil/100 micron magnesium alloy foil/200 micron tin alloy foil was then rolled such that there was a 60% reduction in thickness. This laminated trilayer was then folded in half, and again rolled such that the total thickness was reduced from 400 microns to 200 microns. This process was repeated until the desired number of layers had been introduced to the composite. Finally, the thickness of the multi-layer composite was reduced to the desired thickness of 25 microns.

The foil was then assembled into an electrochemical cell with a lithium nickel-manganese-cobalt oxide cathode. A polypropylene membrane was used as the separator, and the cell was flooded with a 1 M solution of lithium hexafluorophosphate in a 30:70 mixture of ethylene carbonate:ethyl methyl carbonate with 5 wt % monofluoroethylene carbonate. The battery was charged at a constant rate, inserting lithium into the anode. The anode was then discharged using a dynamic profile. In this profile, the initial discharge current was 100× greater than the charge current, and it subsequently decayed with time. This alternative dealloying process introduced a level of porosity into the composite foil.

Figure 9:
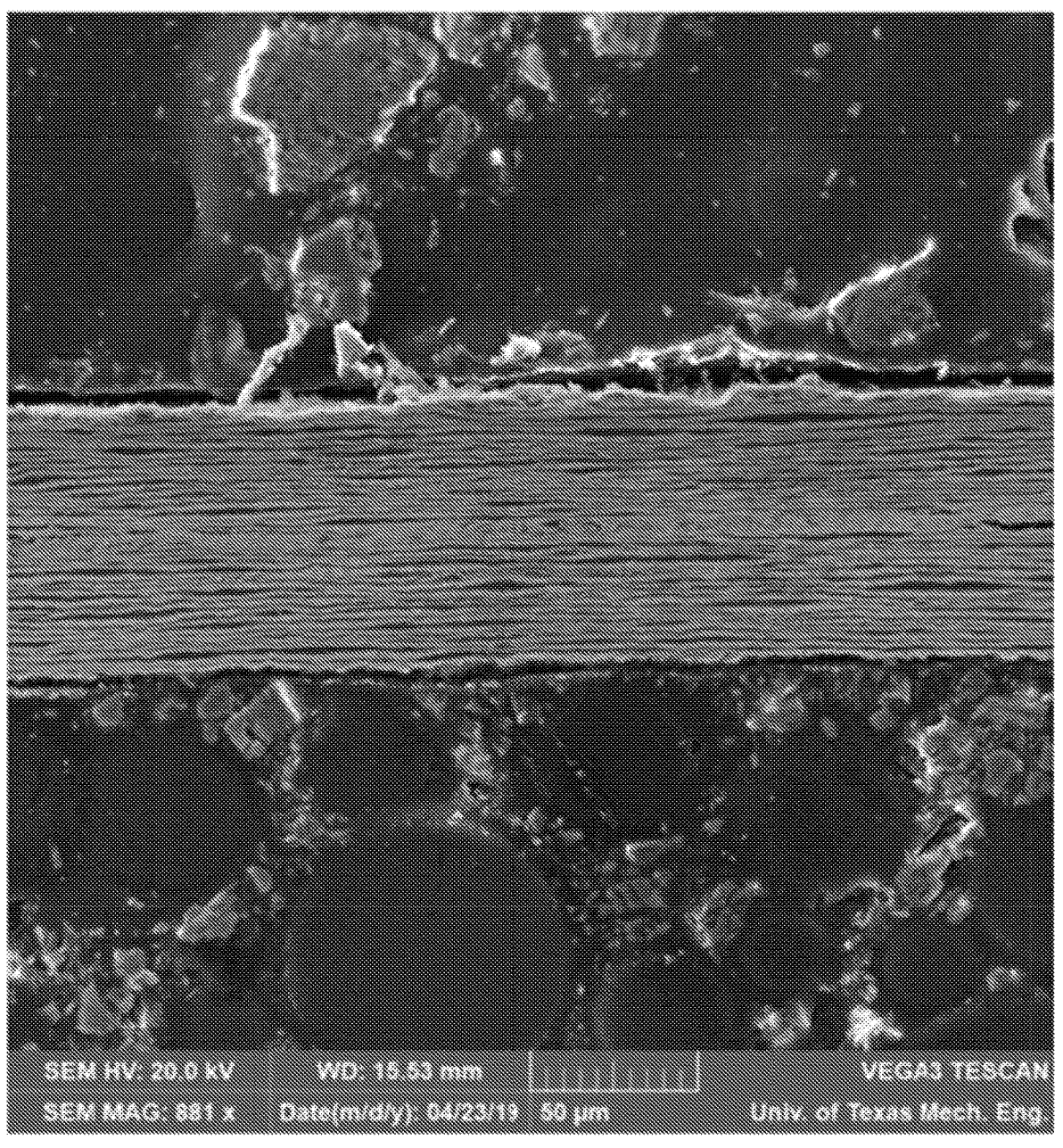
FIG. 9 shows a cross-sectional electron micrograph image of a multilayer composite foil material comprising alternating layers of 86Mg-14Li and 88Sn-5Sb-5Cu-2Bi.
Figure 10:
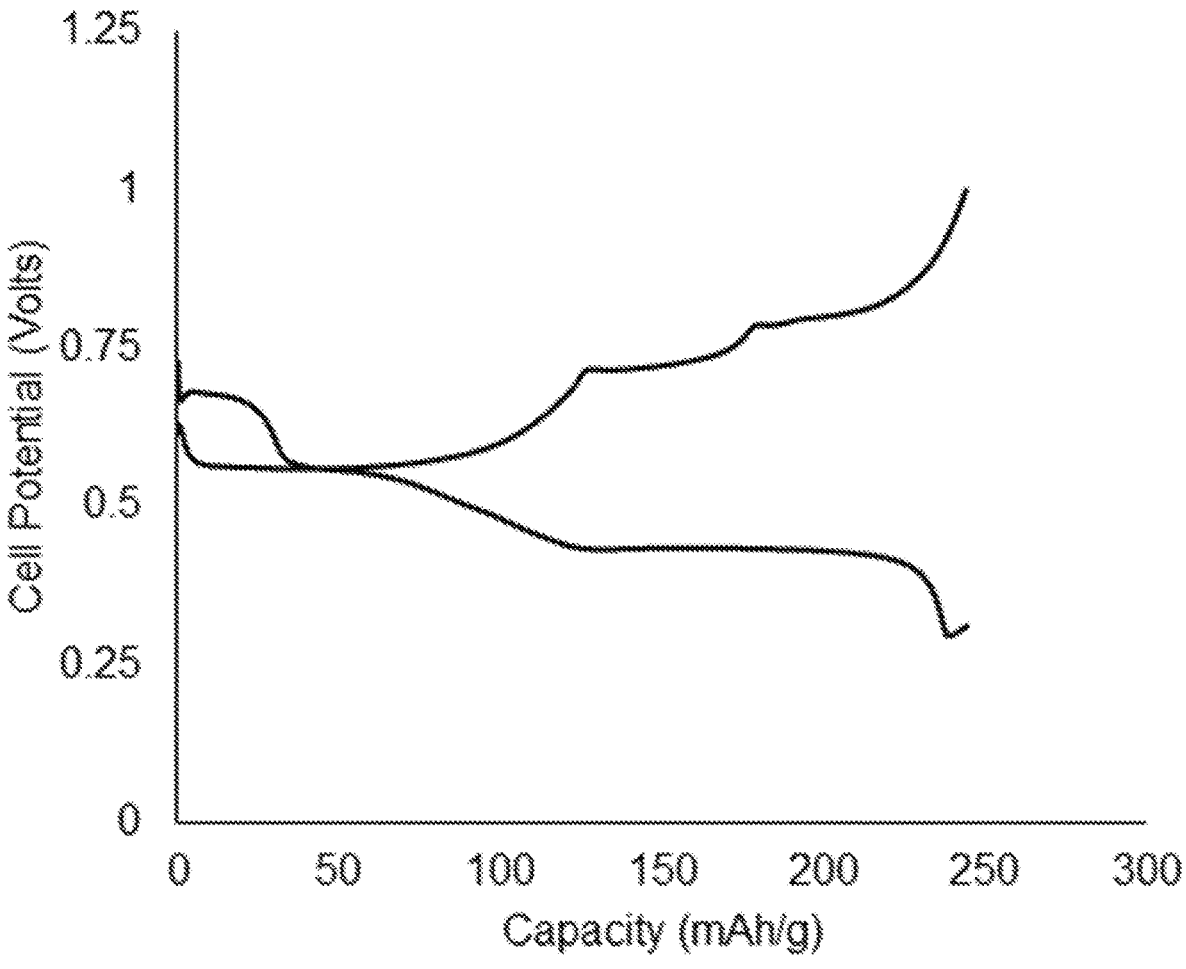
FIG. 10 provides a plot showing a voltage profile corresponding to the tenth charge-discharge cycle of an 88Sn-5Sb-5Cu-2Bi/Mg—Li composite foil.

FIG. 9 shows a cross-sectional electron micrograph image of the resulting composite foil. Due to the closer hardness match between the tin alloy and the magnesium alloy, a much finer microstructure could be achieved than in the Sn/Cu composite foil material described above in Example 3. Subsequent cycling was highly reversible, as represented by the voltage profile of the 10$^{th}$ cycle shown in FIG. 10.

Example 5—Tin/Aluminum/Magnesium-Lithium Composite Foil Material

Approximately 50 grams of the desired weight ratios of tin, antimony, copper, and bismuth were melted in air at 700° C. to form a tin alloy of the composition 88Sn-5Sb-5Cu-2Bi. The melt was then cast into a graphite mold and allowed to cool in a rectangular mold approximately 25 mm×25 mm×100 mm in size. The ingot was subsequently solution treated at 200° C., and then cut into a section 25 mm×25 mm×10 mm. This section was anisotropically cold-rolled with a Durston mill to a thickness of 200 microns.

Approximately 9 grams of magnesium and 1 gram of lithium were melted together in a silicon carbide crucible under an argon atmosphere and cast into a graphite mold approximately 25 mm×25 mm×100 mm in size to form a magnesium alloy having a composition of approximately 90Mg-10Li. This metal was then cut into a section 25 mm×25 mm×10 mm, and anisotropically cold-rolled such that there was a 50% reduction in thickness. At this point, the foil was annealed under argon at 300 degrees for one hour. The foil was then anisotropically cold-rolled down to a thickness of 100 microns, and again annealed under argon at 300 degrees for one hour.

The surface of the magnesium alloy foil was first degreased using acetone, and mechanically polished using abrasives.

A stack of 200 micron tin-alloy/100 micron aluminum/200 micron tin alloy was rolled such that there was a 50% reduction in thickness. This laminated trilayer was repeated until there were 4 layers and rolled to 200 microns.

A stack of 200 micron tin-aluminum laminate foil/20 micron zinc foil/100 micron magnesium alloy foil/20 micron zinc foil/200 micron tin-aluminum laminate foil was then rolled such that there was a 60% reduction in thickness. This laminated trilayer was then folded in half, and again rolled such that the total thickness was reduced from 400 microns to 200 microns. This process was repeated until the desired number of layers had been introduced to the composite. In this example, the insertion of the zinc interlayer represents a third means by which an interlayer can be introduced. In this case, the zinc interlayer limited the contact between the tin material and the magnesium-material, drastically reducing the propensity of the layers to react.

Figure 11:
FIG. 11 shows a cross-sectional electron micrograph image of a multilayer composite foil material having a hierarchical structure and comprising layers of a Sn alloy, an Al alloy, and a Mg—Li alloy, with Zn interlayers.

FIG. 11 shows a cross-sectional electron micrograph image of the resulting composite. This cross-sectional electron micrograph image demonstrates the flexibility of the accumulative roll bonding manufacturing process, allowing for the introduction of hierarchical structures to improve performance.

The thickness of the multi-layer composite was reduced to the desired thickness of 25 microns. The foil was then assembled into an electrochemical cell with a lithium nickel-manganese-cobalt oxide cathode. A polypropylene membrane was used as the separator, and the cell was flooded with a 1 M solution of lithium hexafluorophosphate in a 30:70 mixture of ethylene carbonate:ethyl methyl carbonate with 5 wt. % monofluoroethylene carbonate. The battery was charged at a constant rate, inserting lithium into the anode. The anode was then discharged using a dynamic profile. In this profile, the initial discharge current was 100× greater than the charge current, and it subsequently decayed with time. This alternative dealloying process introduced a level of porosity into the composite foil.

Figure 12:
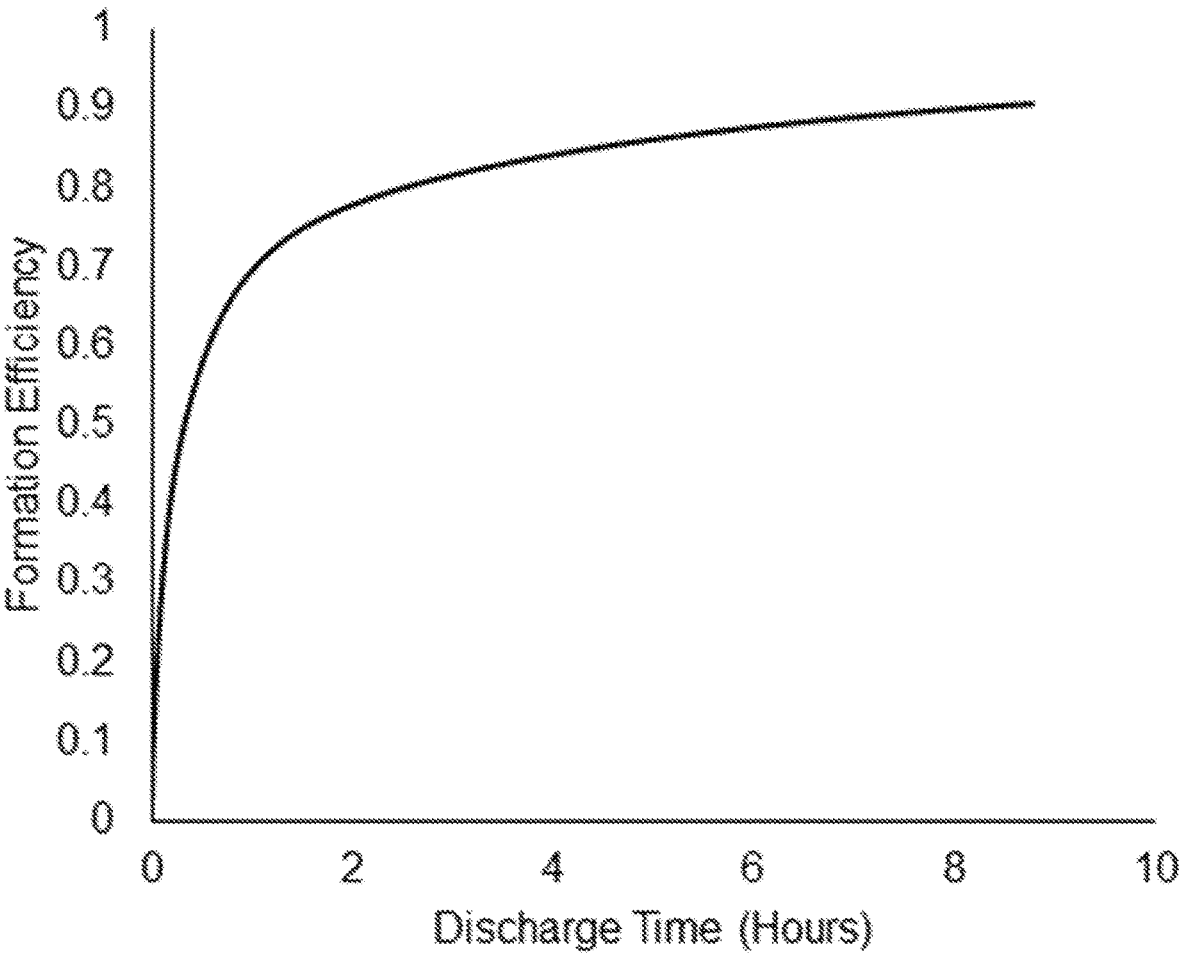
FIG. 12 provides a plot showing the evolution of formation efficiency during the initial dynamic discharge of a lithium ion battery comprising a Sn/Al/Mg composite foil with Zn interlayers and a lithium nickel-manganese-cobalt oxide cathode.
Figure 13:
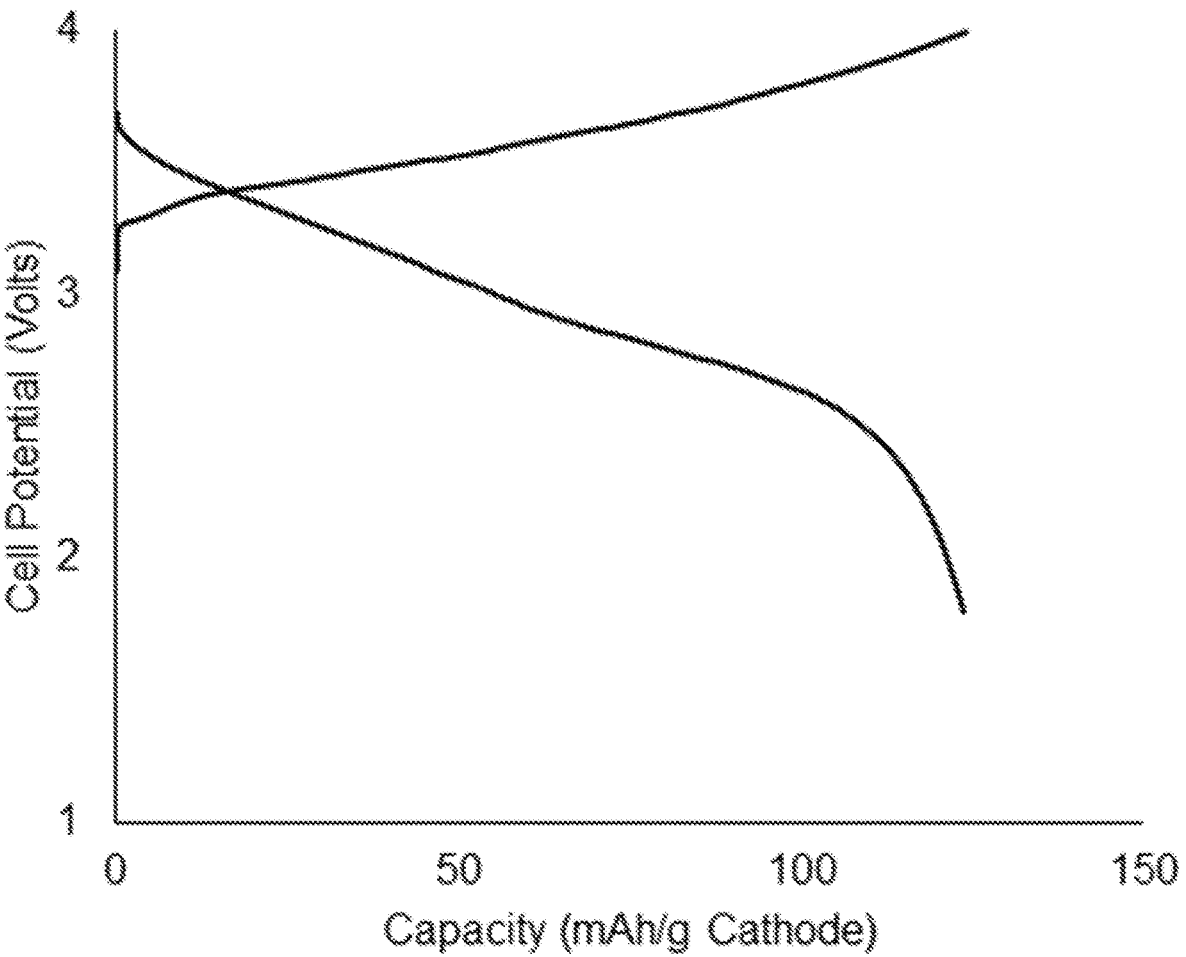
FIG. 13 provides a plot showing a voltage profile corresponding to the tenth charge-discharge cycle of a lithium ion battery comprising a Sn/Al/Mg composite foil with Zn interlayers and a lithium nickel-manganese-cobalt oxide cathode.

FIG. 12 shows the evolution of the formation efficiency for the composite foil during the first discharge. This demonstrates that the dynamic formation process described above can be implemented in a realistic battery chemistry using a layered metal oxide cathode. After this dynamic formation, Sn/Mg—Li composites operate highly reversibly, as demonstrated by the reproduction of voltage profile for the tenth cycle in FIG. 13.

Example 6—Aluminum/Copper Composite Foil Material

Figure 14:
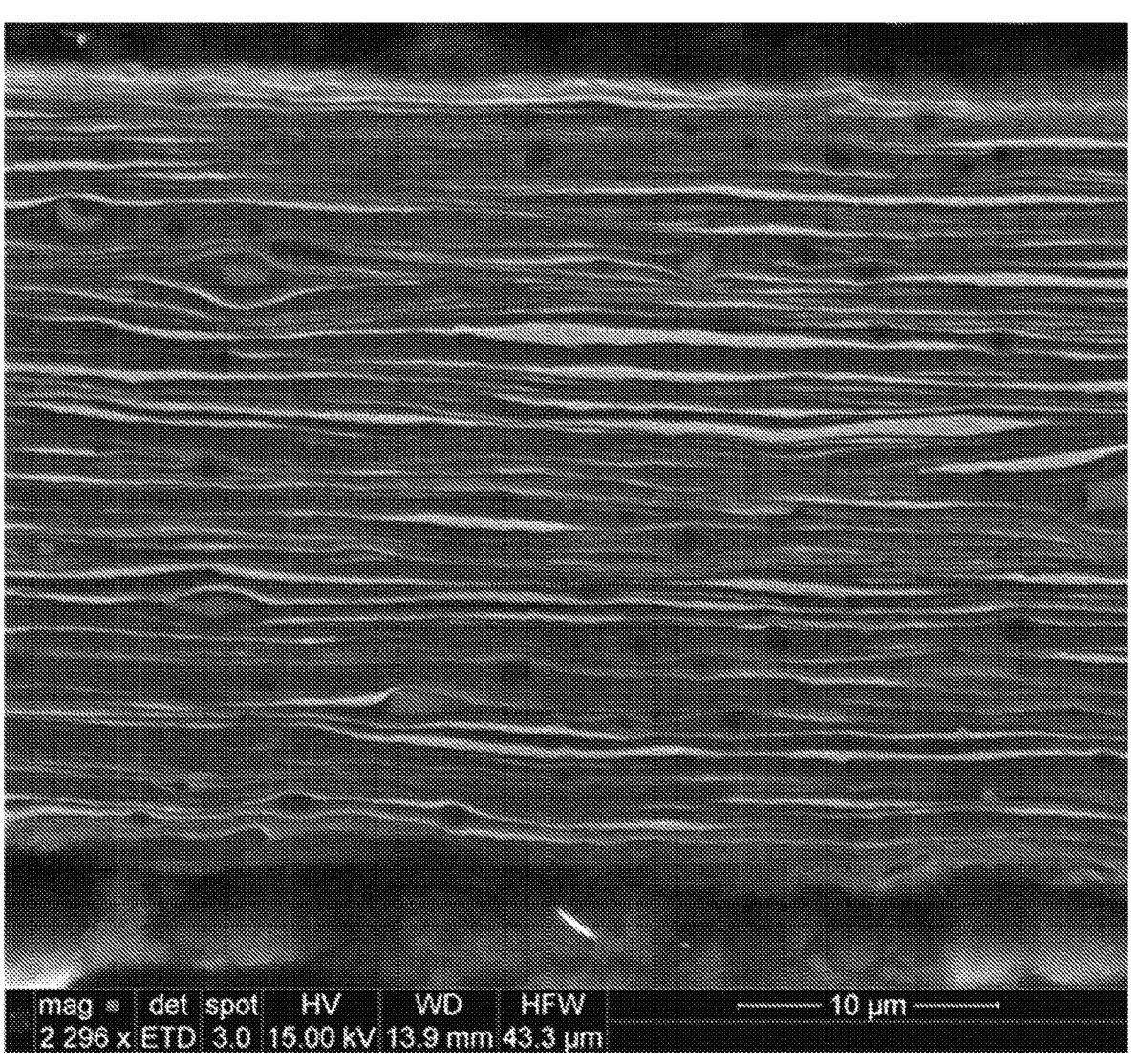
FIG. 14 shows a cross-sectional electron micrograph image of a multilayer composite foil material comprising alternating layers of an Al alloy and Cu.

An aluminum alloy foil was obtained, comprising a 6061 aluminum alloy. The composition (wt. %) of the aluminum was 95.8-98.6% Al, 0.04-0.35% Cr, 0.15-0.4% Cu, up to 0.7% Fe, 0.8-1.2% Mg, up to 0.15% Mn, 0.4-0.8% Si, up to 0.15% Ti, up to 0.25% Zn, and up to 0.15% impurities. A copper foil was also obtained and accumulatively roll bonded into a multilayer composite foil having approximately 60 layers. A cross-sectional electron micrograph image of the multilayer composite foil material is shown in FIG. 14.

Figure 15:
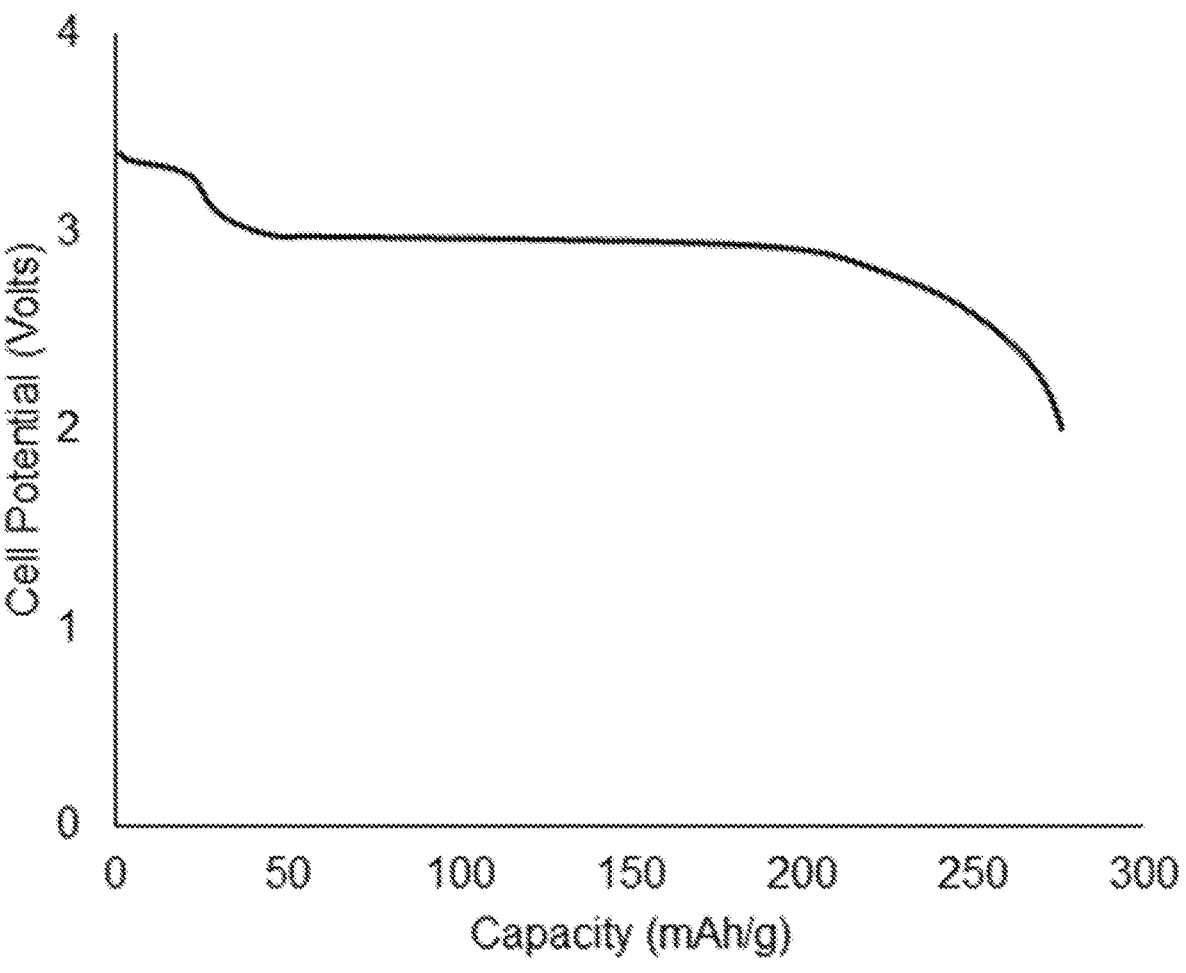
FIG. 15 provides data showing a voltage profile corresponding to the second charge-discharge cycle of a lithium ion battery comprising an Al alloy/Cu composite foil anode and a lithium iron phosphate cathode.

The composite foil was then assembled into a lithium ion electrochemical cell with a lithium iron phosphate cathode and cycled at C/10. The voltage profile corresponding to the second discharge of the battery is reproduced in FIG. 15. This system is of particular interest due to the low material cost and high abundance of the constituent elements.

Example 7—Aluminum/Magnesium-Lithium Composite Foil Material

A 86% magnesium/14% lithium alloy was prepared as generally described above. This metal was then processed into a foil. An Al foil was also obtained.

Figure 16:
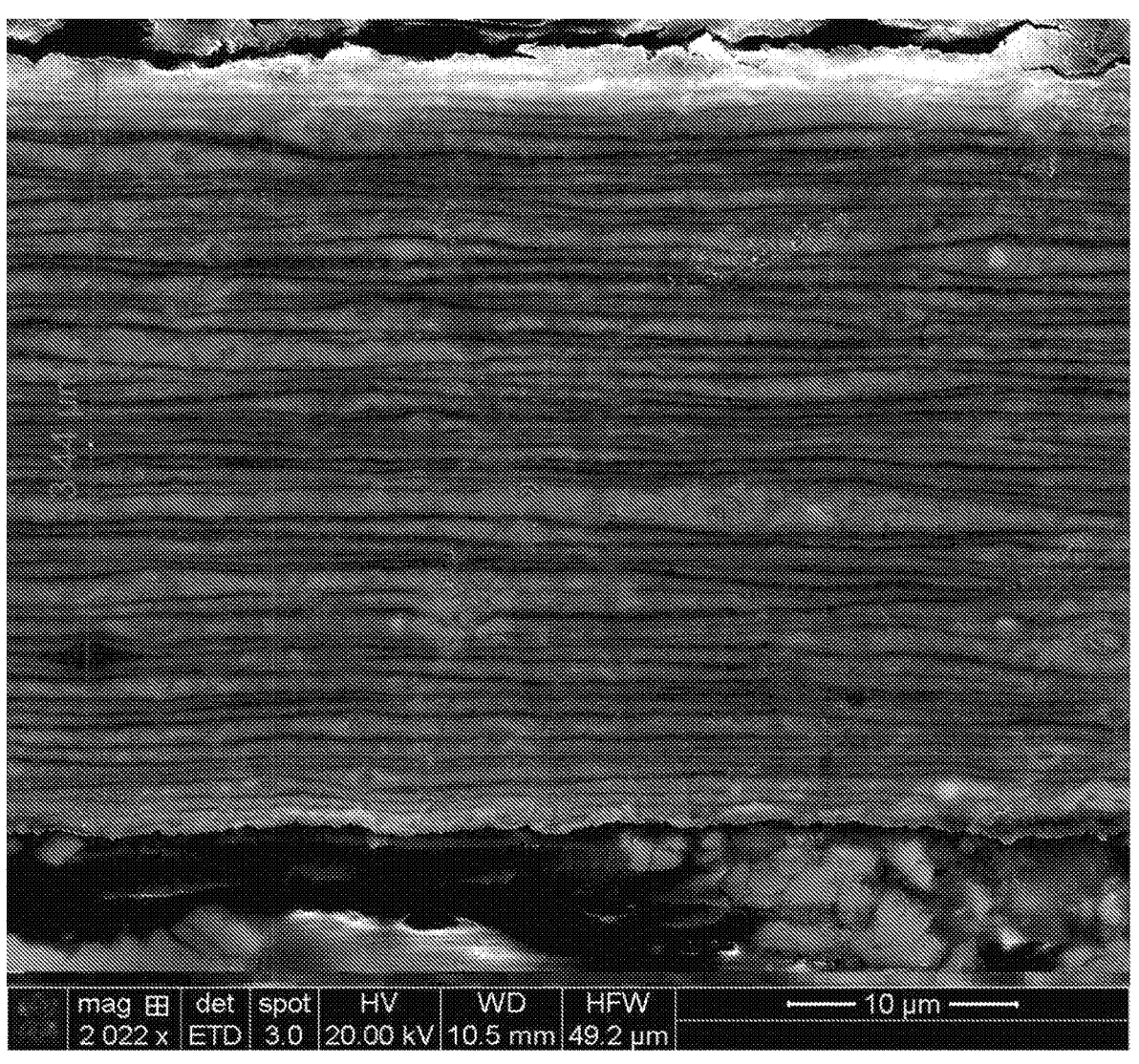
FIG. 16 shows a cross-sectional electron micrograph image of a multilayer composite foil material comprising alternating layers of 86Mg-14Li and an Al alloy.

The Mg—Li and Al foils were accumulatively roll bonded into a multilayer composite foil having approximately 64 layers and a thickness of about 30 μm. The composite foil was then assembled into an electrochemical cell and cycled against metallic lithium a number of times. A cross-sectional electron micrograph image of the multilayer composite foil material is shown in FIG. 16.

Figure 17:
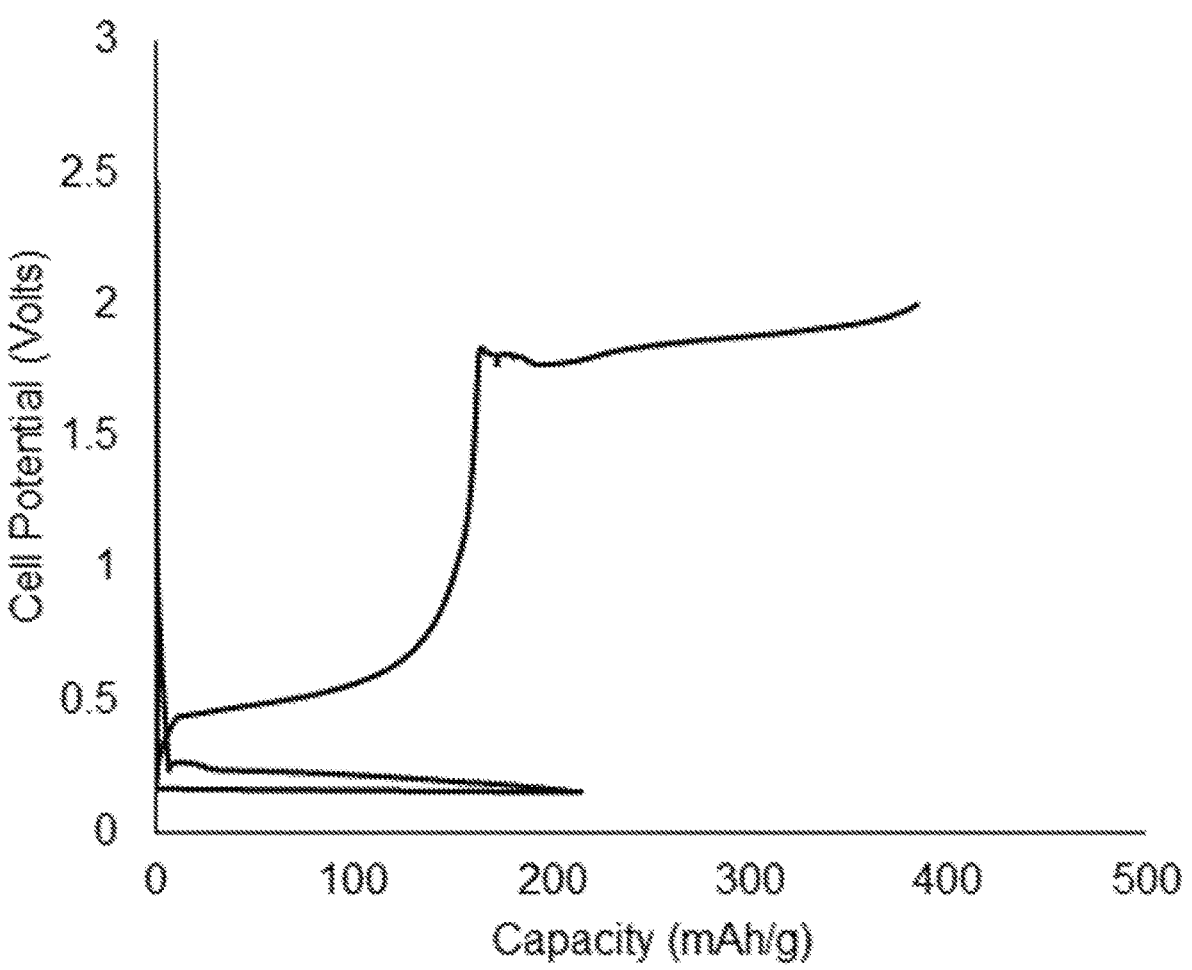
FIG. 17 provides a plot showing a voltage profile corresponding to the first charge-discharge cycle of an Al alloy/Mg—Li composite foil.

During the first cycle of this foil, the active metal present in the magnesium alloy could be directly accessed, demonstrating the unique promise of including lithium-containing alloys in a composite foil. The voltage profile for the first cycle of this foil versus a lithium-metal counter electrode is shown in FIG. 17.

Example 8—Aluminum/Magnesium-Lithium Composite Foil Material

Figure 18:
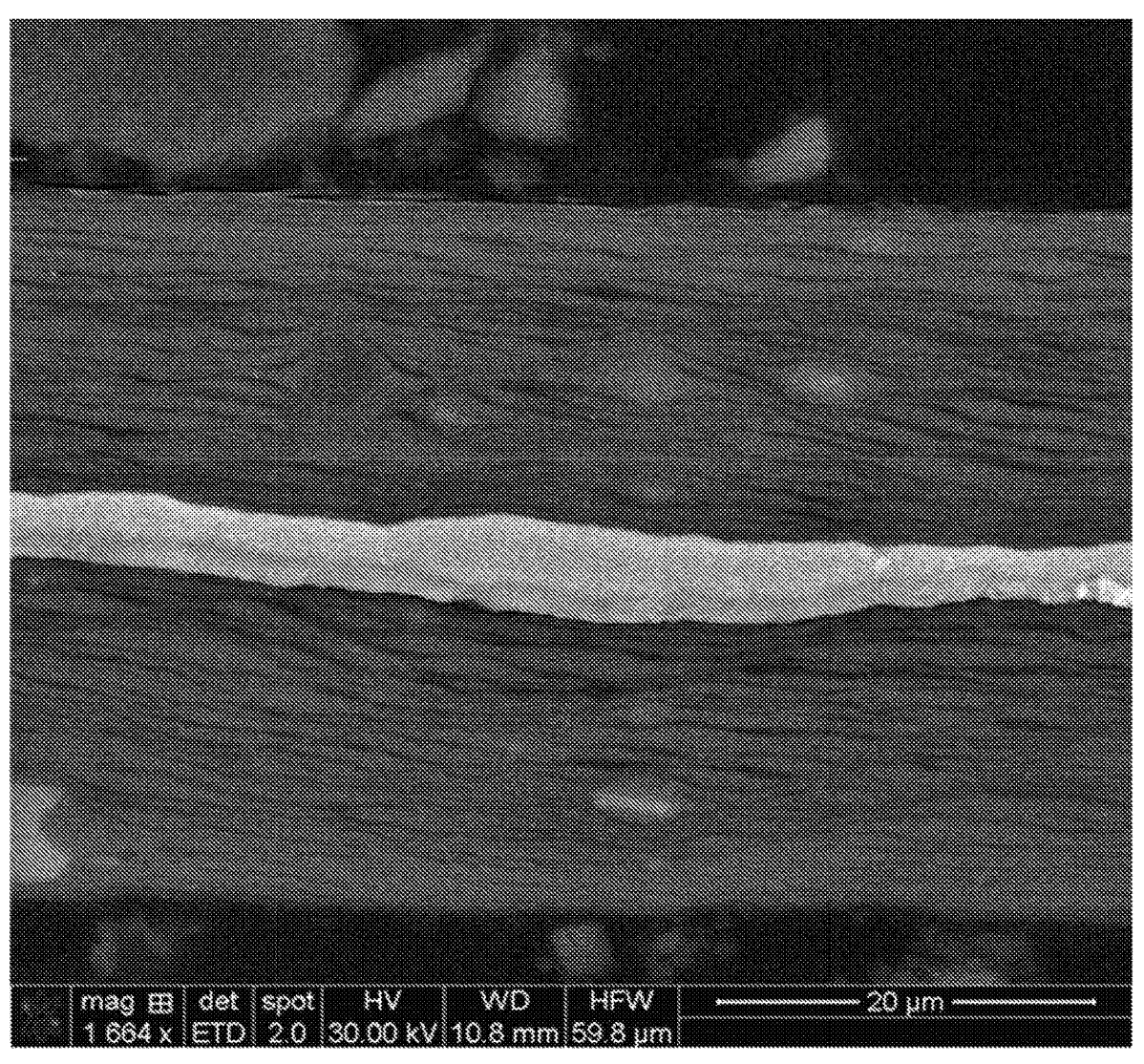
FIG. 18 shows a cross-sectional electron micrograph image of a multilayer composite foil material comprising alternating layers of 86Mg-14Li and an Al alloy with a central copper current collector.

A 86% magnesium/14% lithium alloy was prepared as generally described above. This metal was then processed into a foil. An aluminum 6061 and copper foil were also obtained. An Al/Mg composite was prepared as describe above. During the final step, an Al—Mg laminate/Copper/Al—Mg laminate stack was processed to create a dual-sided multilayer composite foil material, symmetric about a central copper current collector. The cross section of this foil can be seen in FIG. 18. This example serves to highlight the flexibility of the synthetic approach.

Example 9—Dispersion of Alumina Nanoparticles in Tin Alloy Foil

A tin alloy foil was prepared as above and folded in half. 50 mg of nanosized alumina was dispersed between the two layers of tin. The stack was rolled such that there was a 50% reduction in thickness. This process of dispersing 50 mg of alumina between layers of the tin alloy was repeated three times. Finally, the folding/cold-bonding process was repeated three additional times to ensure even dispersion of the particulates. The foil was then annealed under argon at 200° C. for 1 hour.

Example 10—Dynamic Formation of Composite Foil Anodes

A composite foil material anode was assembled into a lithium ion electrochemical cell. The cell was charged at a constant rate, inserting lithium into the anode. The anode was then discharged using a dynamic profile. In this profile, the initial discharge current was 100× greater than the charge current, and it subsequently decayed with time. This alternative dealloying process introduced a level of porosity into the composite foil.

Example 11—Anode Formation Process

A new formation procedure unique to composite foil material-based batteries has been developed. Normally, after a battery is assembled in a factory, the first step is to slowly charge and discharge the battery at least once. This is done at a constant current, so the batteries charge linearly increases over 10 hours, followed by a linearly discharge over the next 10 hours. This process is called formation.

In the process described in this example, a highly rapid discharge during the formation process can drastically improve performance. The initial discharge current is incredibly high, and it rapidly decays over time. Although this has primarily been achieved by controlling the potential of the battery, this could also be controlling the current of the battery. An example is provided below.

Normal Formation Discharge: The battery is discharged at a constant current for 10 hours.

New Formation Discharge: The anode is driven to 2.0V vs lithium. This results in a rapid discharge for approximately 20 seconds, followed by a decay in discharge current with time. In this example, the process was carried out for 20 hours, but it could be cut-off earlier.

Figure 19A:
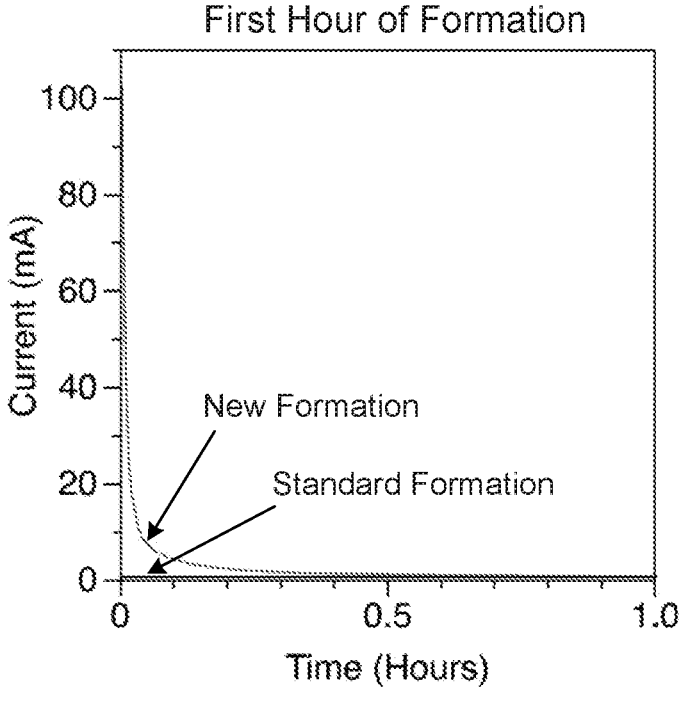
FIG. 19A and FIG. 19B provide plots comparing the current of batteries prepared using new formation discharge conditions and standard formation discharge conditions over time after the first hour of new formation (FIG. 19A) and full formation (FIG. 19B).
Figure 19B:
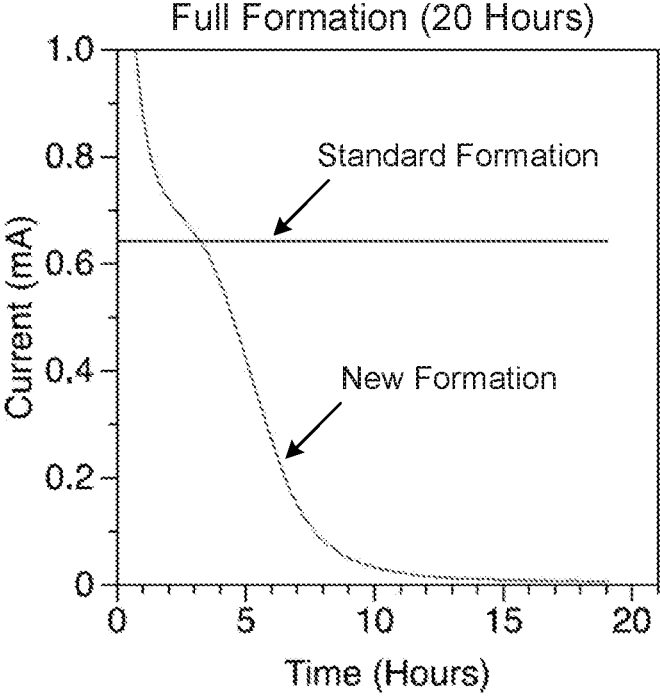

FIG. 19A and FIG. 19B are plots comparing the current of batteries prepared using new formation discharge conditions and standard formation discharge conditions after the first hour of new formation (FIG. 19A) and full formation (FIG. 19B). Importantly, the current starts very high and falls with time, in contrast to the standard constant current formation. It is the rapid delithiation of the foil during the initial minute of discharge that results in the performance improvement. This new procedure has no relevance to traditional anode systems but may have relevance to other alloying anodes. Without wishing to be bound by any theory, this new formation procedure may achieve benefits by resulting in an introduction of porosity to the foil. For example, after the initial discharge of the formation process, the composite foil material of the anode may have a porosity of up to 50%.

REFERENCES

Heligman et al., 2019, "Zn—Sn Interdigitated Eutectic Alloy Anodes with High Volumetric Capacity for Lithium-Ion Batteries," Joule, 3, 1-13, DOI: 10.1016/j.joule.2019.01.005.

Kreder et al., 2017, "Interdigitated Eutectic Alloy Foil Anodes for Rechargeable Batteries," ACS Energy Lett., 2, 2422-2423, DOI: 10.1021/acsenergylett.7b00844.

International Patent Application Publication No. WO/2018/201125.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. It will be appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A composite foil material exhibiting a hierarchical structure, wherein the hierarchical structure comprises different regions of alternating first layers and second layers, comprising:
   a plurality of first layers comprising a first metal, which is a member selected from the group consisting of Al, Si, Zn, Ga, Ag, Cd, In, Sn, Sb, Au, Pb, Bi, and Mg;
   a plurality of second layers comprising a second metal, which is a member selected from the group consisting of Cu, Zn, Mg, Fe, Ni, Al, Zr, Hf, Nb, and Mo, wherein the hierarchical structure comprises from 8 to 512 first layers alternating with from 8 to 512 second layers, wherein individual layer thickness is between 0.05 µm to –2 µm, and has an interface density of between 0.5 and 20 µm$^{-1}$, wherein at least some different regions of alternating first layers and second layers have different total thicknesses, different layer thicknesses, or different numbers of layers;
   an active metal, which is a member selected from the group consisting of lithium, sodium, potassium and magnesium; and
   wherein the active metal is less reactive toward the second metal than the first metal.

2. The composite foil material of claim 1, wherein the active metal is potassium.

3. The composite foil material of claim 1, wherein the first layers preferentially uptake and release cations of the active metal as compared to the second layers.

4. The composite foil material of claim 1,
   wherein the first layers exhibit uptake of cations of the active metal during electrochemical reactions at a first potential relative to an electrode of the active metal in metallic form, and
   wherein the second layers do not exhibit uptake of cations of the active metal in electrochemical reactions at the first potential or wherein the second layers exhibit uptake of cations of the active metal in electrochemical reactions at the first potential at a slower rate than the first layers.

5. The composite foil material of claim 1, wherein the active metal is lithium, and wherein the first layers exhibit uptake of lithium cations in electrochemical reactions at a potential of from 0.0 V to 1.5 V relative to Li/Lit.

6. The composite foil material of claim 5, wherein the second layers exhibit slower uptake of lithium cations in electrochemical reactions at the potential of from 0.0 V to 1.5 V relative to Li/Li$^+$ as compared to the first layers.

7. The composite foil material of claim 1, wherein the active metal is sodium.

8. The composite foil material of claim 1, wherein the active metal is lithium.

9. The composite foil material of claim 1, wherein the first metal comprises a tin-rich alloy, an aluminum-rich alloy, an indium-rich alloy, a zinc-rich alloy, or a lead-rich alloy-.

10. The composite foil material of claim 1, wherein the plurality of first layers or the plurality of second layers is alloyed with the active metal.

11. The composite foil material of claim 1, which exhibits the hierarchical structure from roll bonding.

12. The composite foil material of claim 1, further comprising
   a plurality of interlayers, where at least one interlayer is positioned between two first layers, or between two second layers.

13. The composite foil material of claim 12, wherein at least one interlayer comprises a metal different from the first metal and the second metal.

14. An electrochemical cell comprising:
   a cathode;
   an anode, the anode comprising the composite foil material of claim 1; and
   an electrolyte between the cathode and the anode.

15. A method for preparing a composite foil material exhibiting a hierarchical structure comprising different regions of alternating first layers and second layers,
   providing a composite foil material comprising:
   a plurality of first layers comprising a first metal, which is a member selected from the group consisting of Al, Si, Zn, Ga, Ag, Cd, In, Sn, Sb, Au, Pb, Bi, and Mg; and
   a plurality of second layers comprising a second metal, which is a member selected from the group consisting of Cu, Zn, Mg, Fe, Ni, Al, Zr, Hf, Nb, and Mo, wherein the hierarchical structure comprising from 8 to 512 first layers alternate with from 8 to 512 second layers, wherein individual layer thickness is between 0.05 µm to 2 µm, wherein the hierarchical structure comprises different regions of alternating first layers and second layers, and has an interface density of between 0.5 and 20 µm$^{-1}$, wherein at least some different regions of alternating first layers and second layers have different total thicknesses, different layer thicknesses, or different numbers of layers; and
   subjecting the composite foil material to an electrochemical alloying process with an active metal, which is a member selected from the group consisting of lithium, sodium, potassium and magnesium; and wherein the active metal is less reactive toward the second metal than the first metal.

16. The method of claim 15, wherein subjecting the composite foil material to the electrochemical alloying process comprises:
   contacting the composite foil material with an electrolyte containing cations of the active metal; and
   applying an electric potential to the composite foil material to drive uptake of the active metal by the composite foil material.

17. The method of claim 15, wherein subjecting the composite foil material to the electrochemical alloying process comprises:

subjecting the composite foil material to an electrochemical reaction with cations of the active metal at a charging potential and a charging current, wherein the first layers preferentially react with cations of the active metal as compared to the second layers to form a charged composite foil material; and subjecting the charged composite foil material to a discharge process using a discharge current, wherein the first layers preferentially release cations of the active metal as compared to the second layers to form a discharged composite foil material, wherein the discharge current is greater than or equal to the charging current.

18. The method of claim 15, wherein providing the composite foil material comprises:

roll bonding a layer of the first metal and a layer of the second metal to form a first roll-bonded structure; and overlapping at least two first roll-bonded structures and subjecting to roll bonding to form a second roll-bonded structure.

19. The method of claim 18, wherein providing the composite foil material further comprises:

overlapping at least two second roll-bonded structures and subjecting to roll bonding to form a third roll-bonded structure.

20. The composite foil material of claim 1, wherein the plurality of first layers or the plurality of second layers, or both the plurality of first layers and the plurality of second layers contain submicron sized layers.

21. The composite foil material of claim 1, wherein from 8 to 64 first layers alternate with from 8 to 64 second layers.

22. The composite foil material of claim 1, wherein at least some different regions of alternating first layers and second layers have total thicknesses that are the same.

23. The method of claim 15, wherein at least some different regions of alternating first layers and second layers have total thicknesses that are the same.

\* \* \* \* \*